(12) United States Patent
Kondo et al.

(10) Patent No.: US 12,233,768 B2
(45) Date of Patent: Feb. 25, 2025

(54) VEHICLE SEAT LOCKING DEVICE

(71) Applicant: MITSUI KINZOKU ACT CORPORATION, Yokohama (JP)

(72) Inventors: Makoto Kondo, Yokohama (JP); Syunsuke Ochiai, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 346 days.

(21) Appl. No.: 17/834,371

(22) Filed: Jun. 7, 2022

(65) Prior Publication Data
US 2022/0396190 A1 Dec. 15, 2022

(30) Foreign Application Priority Data

Jun. 11, 2021 (JP) .................................. 2021-098223
Jun. 11, 2021 (JP) .................................. 2021-098224

(51) Int. Cl.
*B60N 2/22* (2006.01)
*B60N 2/225* (2006.01)
*B60N 2/90* (2018.01)

(52) U.S. Cl.
CPC ............ *B60N 2/919* (2018.02); *B60N 2/2245* (2013.01); *B60N 2/2258* (2013.01); *B60N 2002/952* (2018.02)

(58) Field of Classification Search
CPC .................................................. B60N 2/2245
USPC .................................................... 297/378.13
See application file for complete search history.

(56) References Cited

U.S. PATENT DOCUMENTS

| | | | | |
|---|---|---|---|---|
| 6,733,078 B1 * | 5/2004 | Zelmanov | .............. | B60N 2/366 297/378.13 X |
| 7,740,317 B2 * | 6/2010 | Yamada | .................. | B60N 2/366 297/378.13 |
| 7,954,898 B2 * | 6/2011 | Van De Geer | ..... | B60N 2/01583 297/378.13 X |
| 7,959,205 B2 * | 6/2011 | Paing | .................. | B60N 2/01583 296/65.03 |
| 8,118,342 B2 * | 2/2012 | Kokubo | .................... | E05C 3/24 297/378.13 |

(Continued)

FOREIGN PATENT DOCUMENTS

| | | | | |
|---|---|---|---|---|
| GB | 2485641 A | * | 5/2012 | ........... B60N 2/2245 |
| JP | 2019-131100 | | 8/2019 | |

*Primary Examiner* — Rodney B White
(74) *Attorney, Agent, or Firm* — NIXON & VANDERHYE, PC

(57) ABSTRACT

Disclosed is a vehicle seat locking device including: a single latch having an engaging groove and first through third arm portions; a ratchet having a restraining portion engaging the first and second arm portions, restraining the latch in first and second latching positions respectively; and an engagement auxiliary lever having a first auxiliary arm portion abutting with a leg portion of a striker and a second auxiliary arm portion pivoting by this abutment. The latch pivots from an unlatching position to the first latching position by engaging its engaging groove with the leg portion entered a striker entering groove of a baseplate, and pivots to a second latching position by the pivot of the second auxiliary arm portion. The leg portion exits the engaging groove by the pivot of the latch to the second latching position to be clamped between the engagement auxiliary lever and the third arm portion.

15 Claims, 21 Drawing Sheets

(56) References Cited

U.S. PATENT DOCUMENTS

| | | | | |
|---|---|---|---|---|
| 8,128,135 | B2* | 3/2012 | Maeta | B60N 2/01583 |
| | | | | 297/378.13 X |
| 8,282,141 | B2* | 10/2012 | Paing | B60N 2/01583 |
| | | | | 297/336 X |
| 8,342,605 | B2* | 1/2013 | Tanaka | B60N 2/366 |
| | | | | 297/378.13 X |
| 8,511,723 | B2* | 8/2013 | Otsuka | B60N 2/01583 |
| | | | | 297/378.13 X |
| 8,708,413 | B2* | 4/2014 | Heeg | B60N 2/01583 |
| | | | | 297/378.13 X |
| 8,727,443 | B2* | 5/2014 | Vedder | B60N 2/366 |
| | | | | 297/378.13 X |
| 8,950,810 | B2* | 2/2015 | Dryburgh | B60N 2/01583 |
| | | | | 297/378.13 |
| 9,493,097 | B2* | 11/2016 | Pejathaya | B60N 2/366 |
| 9,994,129 | B1* | 6/2018 | Shirokane | B60N 2/2245 |
| 11,110,840 | B1* | 9/2021 | Hunt | B60N 2/2245 |
| 11,167,668 | B2* | 11/2021 | Kondo | B60N 2/3009 |
| 11,167,670 | B1* | 11/2021 | Hunt | B60N 2/433 |
| 2013/0259565 | A1* | 10/2013 | Hanaki | B60N 2/36 |
| | | | | 403/376 |
| 2013/0328372 | A1* | 12/2013 | Suzumura | E05B 85/26 |
| | | | | 297/378.13 |
| 2014/0117698 | A1* | 5/2014 | Seto | B60N 2/01583 |
| | | | | 296/65.03 |
| 2020/0086772 | A1* | 3/2020 | Madhu | B60N 2/366 |

* cited by examiner

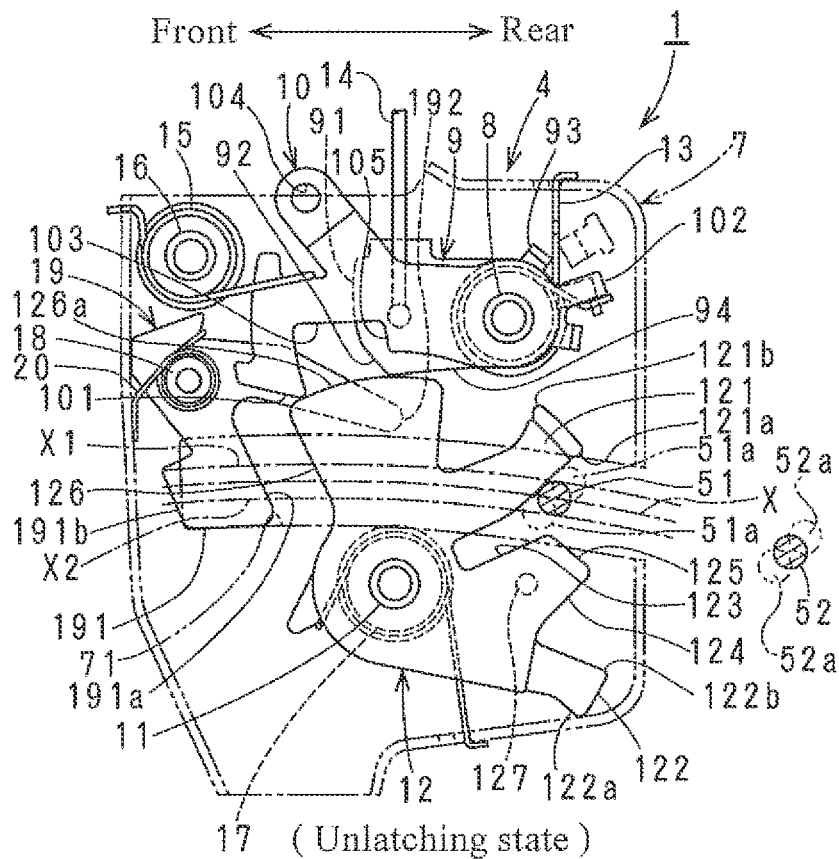
FIG.6 (Unlatching state)
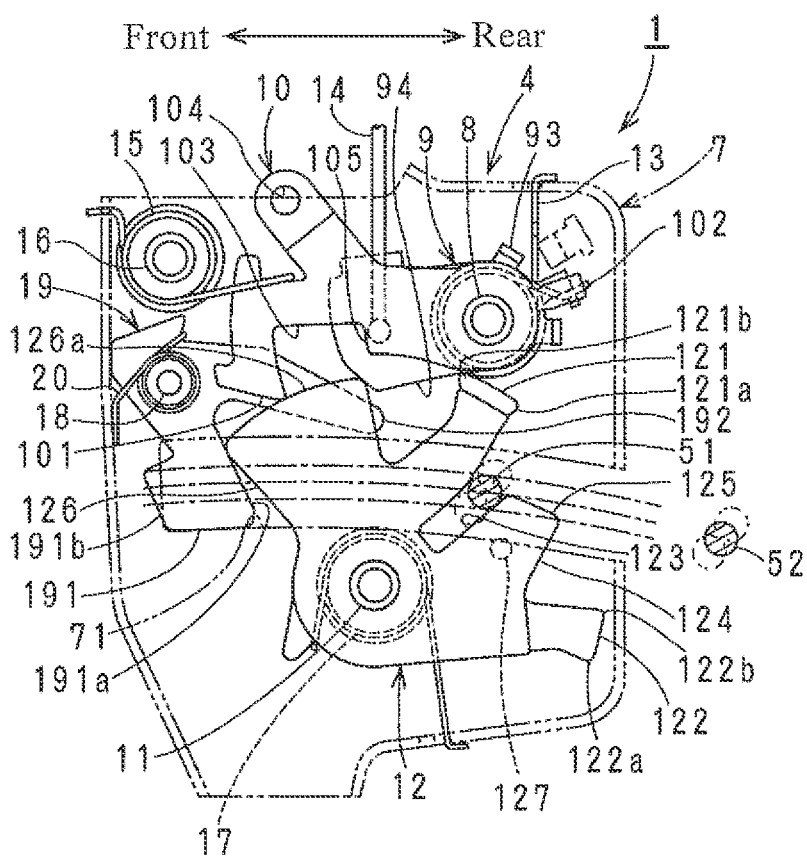
FIG.7

(First latching state)

(Second latching state)

(Unlatching state)

(First latching state)

(Second latching state)

VEHICLE SEAT LOCKING DEVICE

This application claims priority to JP Patent Application No. 2021-098223 filed Jun. 11, 2021, and JP Patent Application No. 2021-098224 filed Jun. 11, 2021, the entire contents of each of which are hereby incorporated by reference.

BACKGROUND OF THE INVENTION

Field of the Invention

The present invention relates to a vehicle seat locking device, particularly relates to a vehicle seat locking device of which a backrest angle of a seat back is possible to be changed in two levels.

Description of the Related Art

Conventionally, some seat locking device of a vehicle seat and so on has a formation that a backrest angle of a seat back is possible to be changed in two levels of a first and second positions by engaging a locking mechanism provided in the seat back pivotably supported to a vehicle body with a striker fixed to the vehicle body.

For example, JP 2019-131100 A discloses a vehicle seat locking device provided in a seat back changeable in two levels of a first and second positions, comprising:
- a striker fixed to a vehicle body side and provided with a first and second bar-shaped engaging portions;
- a first hook plate pivotably supported by a first shaft to a baseplate fixed to the seat back and provided with a first front abutting surface portion which abuts with an opposite side portion to a reclining direction of the seat back against the first bar-shaped engaging portion in a first position of the seat back and a second front abutting surface portion which abuts with an opposite side portion to the reclining direction of the seat back against the second bar-shaped engaging portion in a second position of the seat back;
- a second hook plate pivotably supported by the first shaft to the baseplate and provided with a first rear abutting surface portion which abuts with a portion in the reclining direction of the seat back against the first bar-shaped engaging portion in the first position of the seat back and a second rear abutting surface portion which abuts with a portion in the reclining direction of the seat back against the second bar-shaped engaging portion in the second position of the seat back;
- a pawl pivotably supported by a second shaft to the baseplate and engaged with the first hook plate to stop the pivot of the first hook plate; and
- a cam made to pivot in conjunction with the pawl.

However, there is a problem that the vehicle seat locking device disclosed in JP 2019-131100 A has many parts and a complexed configuration because a member engaging with the first and second bar-shaped engaging portions of the striker is composed with two parts of the first and second hook plates.

SUMMARY OF THE INVENTION

In view of the above disadvantages, an object of the present invention is to provide a vehicle seat locking device having a simple configuration in which a backrest angle of a seat back is possible to be changed in two levels of a first and second positions.

A vehicle seat locking device of the first invention of the present invention comprises:
- a striker fixed to either a vehicle body or a seat back;
- a baseplate fixed to the other of the vehicle body and the seat back and provided with a striker entering groove in which a leg portion provided on the striker is capable of advancing and retreating by operation of the seat back;
- a latch which is supported to the baseplate by a latch shaft to be pivotable at a predetermined angle and is pivotable from an unlatching position to a second latching position via a first latching position and vice versa, wherein the latch comprises an engaging groove capable of engaging with the leg portion entered the striker entering groove, a first arm portion provided at a latching direction side of the engaging groove, a second arm portion provided at an unlatching direction side of the engaging groove, and a third arm portion provided between the engaging groove and the second arm portion;
- a ratchet which is supported to the baseplate by a ratchet shaft to be pivotable at a predetermined angle, is biased in an engaging direction by a spring and is provided with a restraining portion engaging with the first and second arm portions to be capable of restraining the latch in the first and the second latching positions respectively; and
- an engagement auxiliary lever which is supported to the baseplate by a shaft to be pivotable at a predetermined angle and is provided with a first and second auxiliary arm portions, wherein the first auxiliary arm portion is capable of abutting with the leg portion entered the striker entering groove and the second auxiliary arm portion pivots from a standby position to a restraining position by the abutment of the leg portion with the first auxiliary arm portion and is capable of abutting with the latch in the latching direction by its pivot:

wherein the latch is capable of pivoting from the unlatching position to the first latching position by the engagement of the leg portion entered the striker entering groove with the engaging groove, and is capable of pivoting to the second latching position by the movement of the second auxiliary arm portion accompanied with the pivot of the engagement auxiliary lever to the restraining position, and wherein the leg portion of the striker is made to exit from the engaging groove by the pivot of the latch to the second latching position and is clamped between the engagement auxiliary lever and a tip portion of the third arm portion.

A vehicle seat locking device of the second invention of the present invention comprises:
- a striker fixed to either a vehicle body or a seat back and provided with a first leg portion and a second leg portion apart from the first leg portion with a predetermined distance;
- a baseplate fixed to the other of the vehicle body and the seat back and provided with a striker entering groove in which the first and second leg portions are capable of advancing and retreating by operation of the seat back;
- a latch which is supported to the baseplate by a latch shaft to be pivotable at a predetermined angle and is pivotable from an unlatching position to a second latching position via a first latching position and vice versa, wherein the latch comprises an engaging groove capable of engaging with the first leg portion entered the striker entering groove, a first arm portion provided at a latching direction side of the engaging groove, a second arm portion provided at an unlatching direction side of the engaging groove, a third arm portion provided between the engaging groove and the second arm portion, and a pushed portion with which the second leg portion entered the striker entering groove is capable of abutting;

a ratchet which is supported to the baseplate by a ratchet shaft to be pivotable at a predetermined angle, is biased in an engaging direction by a spring and is provided with a restraining portion engaging with the first and second arm portions to be capable of restraining the latch in the first and the second latching positions respectively; and a stopper provided in an inner portion than the striker entering groove in the baseplate: wherein the latch is capable of pivoting from the unlatching position to the first latching position by the engagement of the first leg portion entered the striker entering groove with the engaging groove, and is capable of pivoting to the second latching position by the abutment of the second leg portion entered the striker entering groove with the pushed portion, and wherein the first leg portion of the striker is made to exit from the engaging groove by the pivot of the latch to the second latching position and is clamped between the stopper and a tip portion of the third arm portion.

According to the present invention, since a member engaging with the striker is formed with a single latch, even if a backrest angle of a seat back is possible to be changed in two levels of a first and second positions, it is possible to reduce a number of parts and simplify the configuration of a vehicle seat locking device.

BRIEF DESCRIPTION OF THE DRAWINGS

FIG. 6 is an explanatory drawing showing an unlatching state of the locking mechanism of the first example.

FIG. 7 is an explanatory drawing showing a first state in the middle of an operation from an unlatching state to a first latching state of the locking mechanism of the first example.

DESCRIPTION OF THE PREFERRED EMBODIMENTS

The first example according to the present invention is described with FIGS. 1 to 17 as follows.

Figure 1:
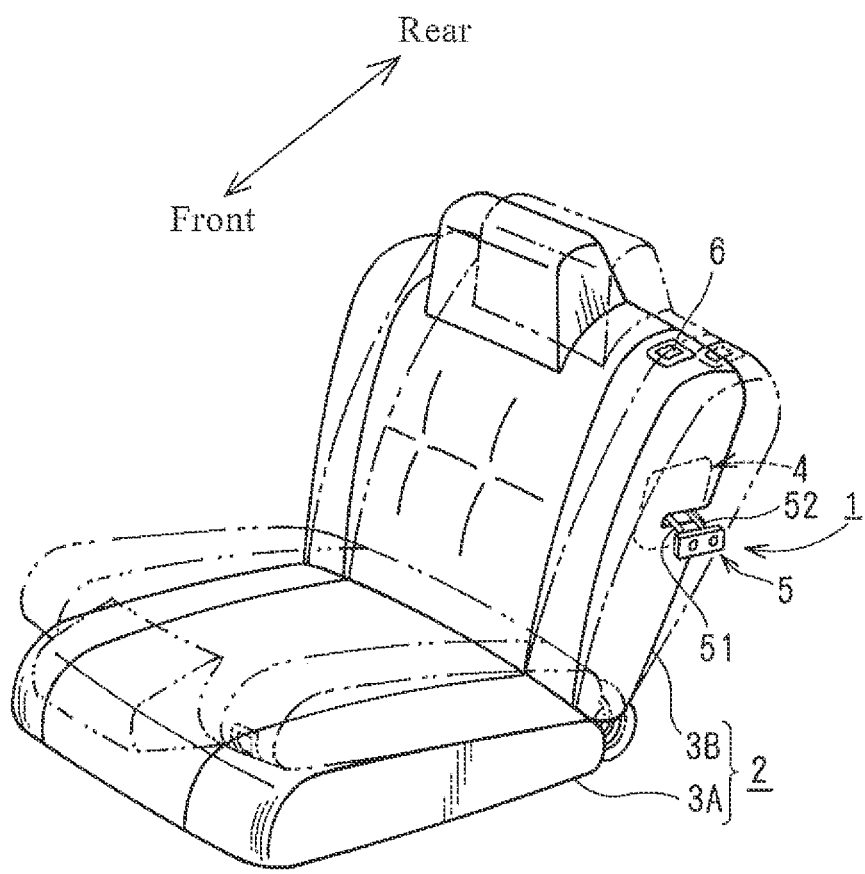
FIG. 1 is a perspective view showing a seat to which a vehicle seat locking device of the present invention is fixed.

As shown in FIG. 1, a rear seat 2 to which a vehicle seat locking device 1 of the present invention is fixed has a seat cushion 3A fixed to a vehicle body floor and a seat back 3B supported to a lower portion of a rear end of the seat cushion 3A by a hinge shaft (not shown) oriented in a lateral direction to be possible to rise up and fall down.

The vehicle seat locking device 1 has a locking mechanism 4 fixed to the seat back 3B side and a striker 5 fixed to the vehicle body side and has a function that a backrest angle of the seat back 3B is possible to be changed in two levels of a first position shown by a solid line in FIG. 1 and a second position which is shown by a two-dot chain line and at which the seat back 3B is more reclined rearward than the first position by engaging the locking mechanism 4 with the striker 5 at a rising position of the seat back 3B.

The seat back 3B is selectively held in the first or second position as described above, and is possible to be made to fall down forward to a falling-down position as shown by the two-dot chain line in FIG. 1 by releasing the engagement between the locking mechanism 4 and the striker 5 based on an operation of an operation member 6 provided on a shoulder portion of the seat back 3B.

As understandable from FIG. 1, the striker 5 is provided with an engaging rod which is formed in a U-like shape in a plane view (no reference sign) and is fixed to the vehicle body side facing a side surface of the seat back 3B. The engaging rod has a first leg portion 51 in a front side and a second leg portion 52 in a rear side apart from the first leg portion 51 with a predetermined distance rearward.

As shown in FIGS. 2 to 5, the locking mechanism 4 has a baseplate 7 made of metal and fixed to a seat frame 31B in the seat back 3B (see FIG. 5), a ratchet including a first and second ratchets 9, 10 supported to the baseplate 7 to be pivotable at a predetermined angle by a ratchet shaft 8 oriented in the lateral direction, a latch 12 supported to the baseplate 7 to be pivotable at a predetermined angle by a latch shaft 11 oriented in the lateral direction, and an engagement auxiliary lever 19 supported to the baseplate 7 to be pivotable at a predetermined angle by a shaft 18 oriented in the lateral direction. Thus, a dimension, particularly a dimension in the front-rear direction of the locking mechanism 4 is reduced to enable to downsize by arranging the first and second ratchets 9, 10 and the engagement auxiliary lever 19 in an upper side of a striker entering groove 71 on the baseplate 7 and arranging the latch 12 in a lower side of the striker entering groove 71 as described below.

The baseplate 7 is made of metal and is provided with the striker entering groove 71 in its approximately middle portion in a vertical direction. The striker entering groove 71 is open rearward such that the first and second leg portions 51, 52 of the striker 5 are capable of advancing and retreating in the front-rear direction when the seat back 3B is operated.

An opening width in the vertical direction of the striker entering groove 71 of the baseplate 7 is set within a range of approximately twofold to threefold of each thickness (diameter) of the first and second leg portions 51, 52 of the striker 5. Thus, even if an entering position of the striker 5 to the striker entering groove 71 of the baseplate 7 is shifted from a standard position in the vertical direction owing to a mounting position tolerance of the rear seat 2, looseness of moving parts of the seat back 3B and so forth, when each shift of movement loci of the first and second leg portions 51, 52 of the striker 5 is within a predetermined permissible range as shown in FIGS. 6 to 17, the first and second leg portions 51, 52 of the striker 5 are allowed to enter the striker entering groove 71.

In FIGS. 6 to 17, the first and second leg portions 51, 52 shown by a solid line are respectively in the standard positions, and the first and second leg portions 51a, 52a shown by a two-dot chain line (see FIG. 6) are respectively in shifted positions from the standard positions in the vertical direction owing to a mounting position tolerance of the rear seat 2, looseness of moving parts of the seat back 3B and so forth. Moreover, a path X shown by a dashed line (see FIG. 6) indicates each standard entering locus of the first and second leg portions 51, 52 to the striker entering groove 71 of the baseplate 7 in the standard position, and paths X1, X2 (see FIG. 6) shown by a dashed line indicate respective entering loci of the first and second leg portions 51a, 52a to the striker entering groove 71 of the baseplate 7 when the shifts are occurred.

Figure 2:
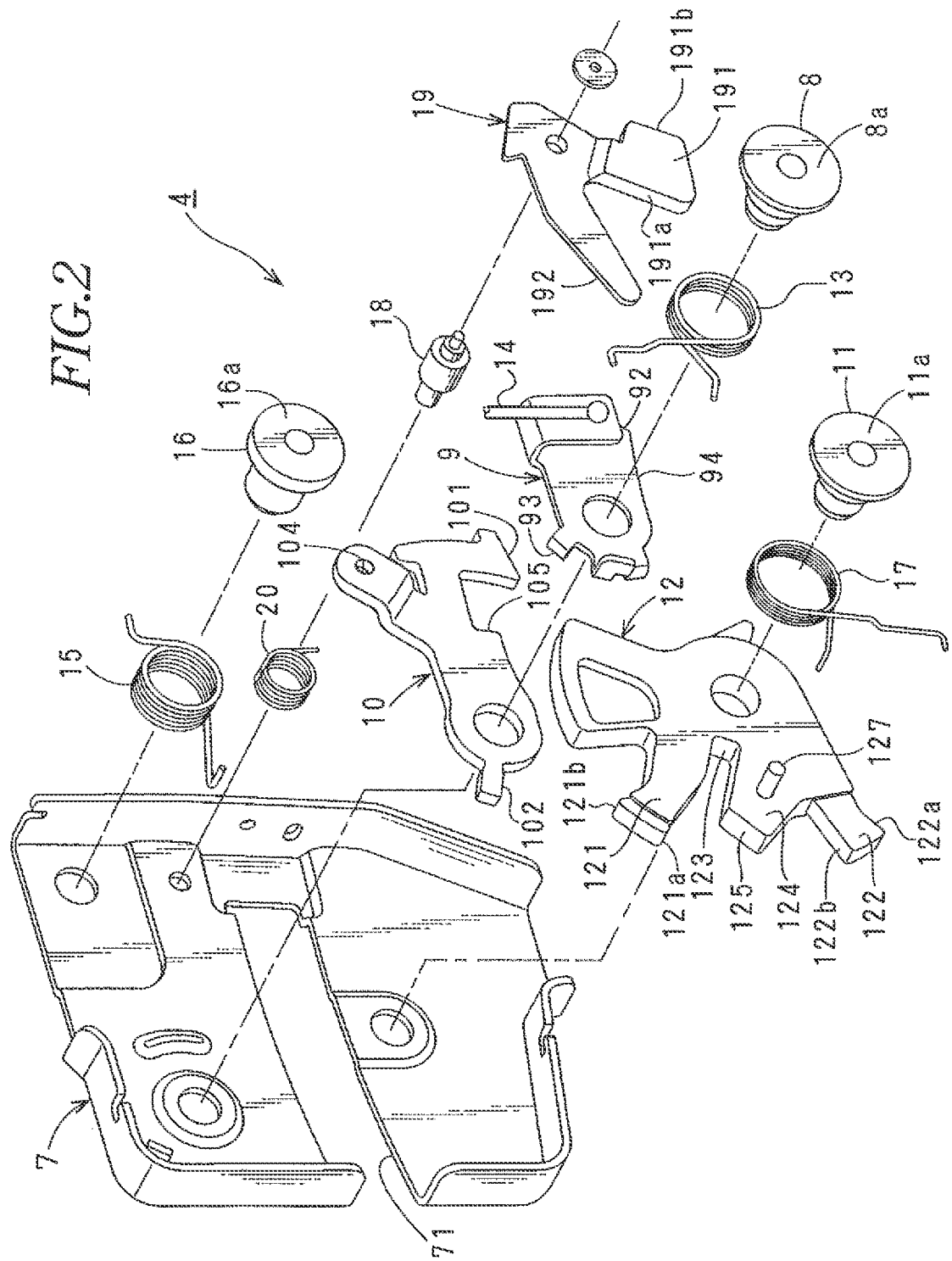
FIG. 2 is an exploded perspective view showing a locking mechanism of the first example.
Figure 5:
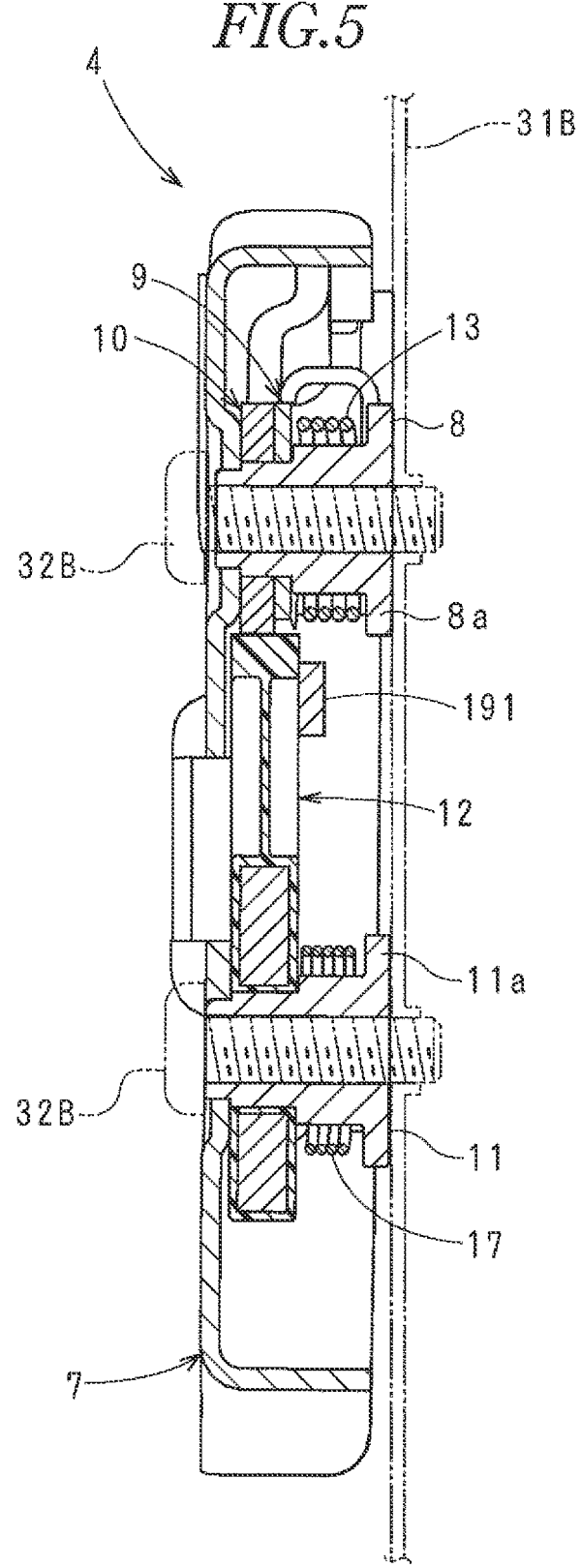
FIG. 5 is a sectional view taken along the line V-V in FIG. 3.

The baseplate 7 is fixed to the seat frame 31B by bolts 32B respectively inserted to a supporting part 16 which is formed in a cylindrical shape with a flange and is fixed to a front upper portion of the baseplate 7 and a first and second shaft parts 8, 11 which are formed in the same shape as the supporting part 16. In detail, as shown in FIGS. 2, 5, the baseplate 7 is fixed to the seat frame 31B by bolts 32B in a state that respective flange portions 16a, 8a, 11a of the supporting part 16 and the first and second shaft parts 8, 11 are made to abut with a surface of the seat frame 31B.

The first ratchet 9 is made of metal, is supported to the baseplate 7 in the upper side of the striker entering groove 71 to be pivotable at a predetermined angle by the ratchet shaft 8, and is biased in an engagement direction (counterclockwise direction in FIG. 3 and clockwise direction in FIG. 4) by a spring 13 supported by the ratchet shaft 8. The first ratchet 9 is coupled with the operation member 6 via an operating force transmission member 14 movable in the vertical direction. Thus, the first ratchet 9 pivots against a biasing force of the spring 13 at a predetermined angle around the ratchet shaft 8 in a releasing direction (clockwise direction in FIG. 3 and counterclockwise direction in FIG. 4) in conjunction with the operation of the operation member 6.

The second ratchet 10 is supported to the baseplate 7 in the upper side of the striker entering groove 71 to be pivotable at a predetermined angle by the ratchet shaft 8 independently of the first ratchet 9, is biased in an engagement direction (counterclockwise direction in FIG. 3 and clockwise direction in FIG. 4) by a spring 15 supported by the supporting part 16 on the baseplate 7, and is made to pivot in the releasing direction in conjunction with the pivot of the first ratchet 9 in the releasing direction. The pivot of the second ratchet 10 in the releasing direction in conjunction with the pivot of the first ratchet 9 in the releasing direction is obtained by making a protruding portion 93 of the first ratchet 9 abut with an arm portion 102 of the second ratchet 10 from the releasing direction.

Figure 3:
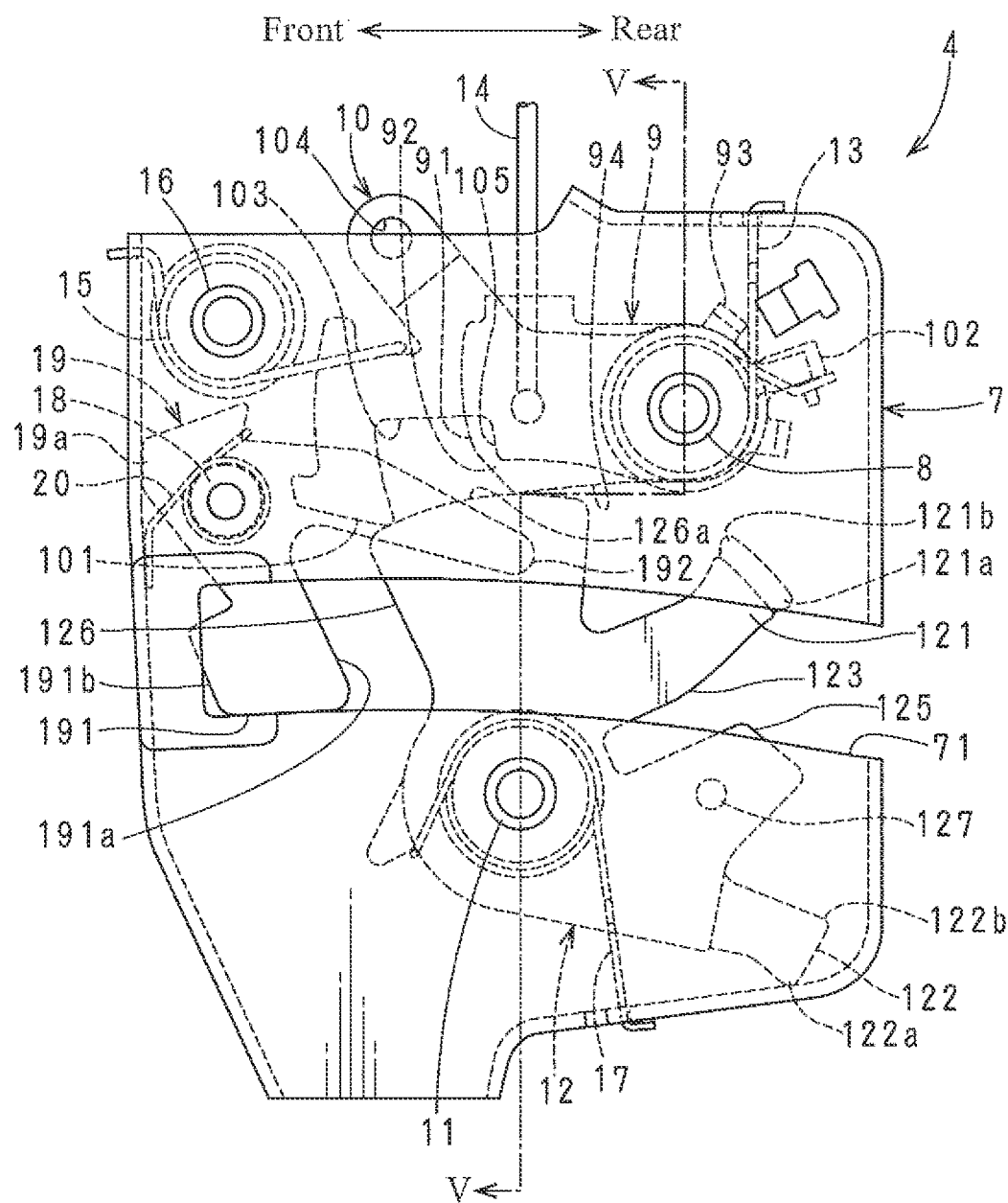
FIG. 3 is a left-side elevational view showing the locking mechanism of the first example.
Figure 4:
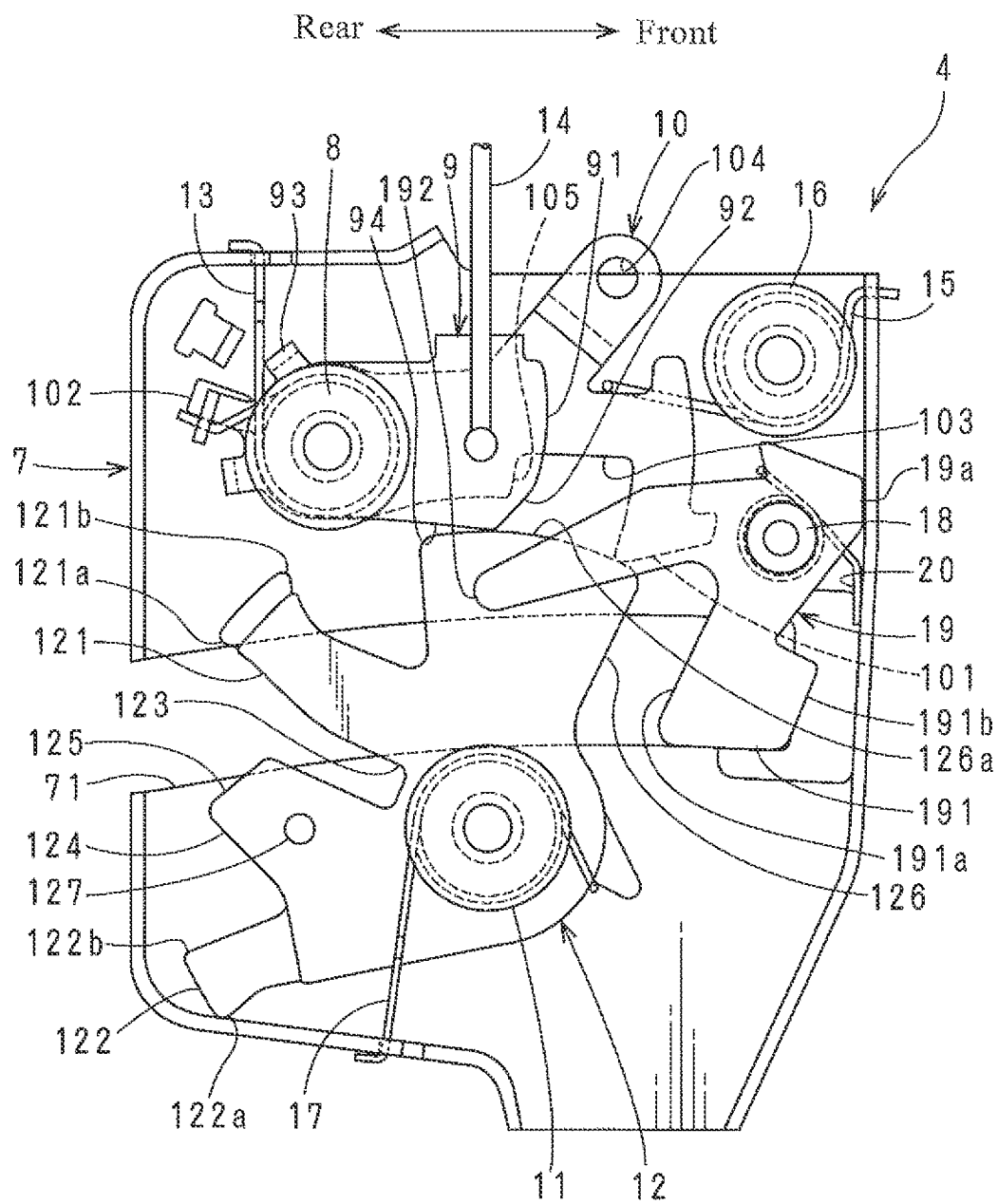
FIG. 4 is a right-side elevational view showing the locking mechanism of the first example.

The engagement auxiliary lever 19 is made of a synthetic resin, is supported to the baseplate 7 in the upper side of an inner portion of the striker entering groove 71 to be pivotable at a predetermined angle by the shaft 18, is biased in a standby direction (for example, counterclockwise direction in FIGS. 3, 6 and clockwise direction in FIG. 4) by a spring 20 supported by the shaft 18, and is regularly held in a standby position shown in FIGS. 3, 4, 6 and so on, in where an upper portion 19a is abutted with the baseplate 7.

Moreover, the engagement auxiliary lever 19 has a first and second auxiliary arm portions 191, 192 respectively extending downward and forward in the standby position. When the first leg portion 51 of the striker 5 enters the striker entering groove 71 to abut with the first auxiliary arm portion 191, the engagement auxiliary lever 19 pivots from the standby position against a biasing force of the spring 20 at a predetermined angle in an entering direction (for example, clockwise direction in FIGS. 3, 6 and counterclockwise direction in FIG. 4) and stops in a restraining position shown in FIG. 15.

The first auxiliary arm portion 191 has a first and second abutting portions 191a, 191b. The first abutting portion 191a is formed on a side facing the entering direction of the first leg portion 51 of the striker 5 and is extended downward to overlap with the striker entering groove 71 in the lateral direction in the standby position. The second abutting portion 191b is formed on the opposite side of the first abutting portion 191a to face a part of the baseplate 7. Thus, when the first leg portion 51 of the striker 5 enters the striker entering groove 71 to abut with the first abutting portion 191a at a predetermined position, the engagement auxiliary lever 19 pivots from the standby position to the restraining position. When the engagement auxiliary lever 19 pivots to the restraining position, the second abutting portion 191b abuts with the baseplate 7 and the engagement auxiliary lever 19 stops in the restraining position by prevented from pivoting further. Preferably, the first and second abutting portions 191a, 191b are formed to be thick such that they are capable of elastically deforming to some degree in the entering direction of the striker 5 in the state that the first leg portion 51 is abutted with the first abutting portion 191a of the first auxiliary arm portion 191 and the second abutting portion 191b of the first auxiliary arm portion 191 abuts with the baseplate 7. Thus, it is capable of reducing an abutting noise when the first leg portion 51 of the striker 5 abuts with the first abutting portion 191a of the first auxiliary arm portion 191. Moreover, it is capable of reducing an abutting noise when the second abutting portion 191b of the first auxiliary arm portion 191 abuts with the baseplate 7.

The second auxiliary arm portion 192 is positioned in the upper side of the striker entering groove 71 when the engagement auxiliary lever 19 is in the standby position. When the engagement auxiliary lever 19 pivots from the standby position in the entering direction, the second auxiliary arm portion 192 abuts with a pushed portion 127 provided on the latch 12 as described below at a predetermined position and pushes the latch 12 to forcibly make it pivot in a latching direction.

The latch 12 is supported to the baseplate 7 in the lower side of the striker entering groove 71 to be pivotable at a predetermined angle by the latch shaft 11, and is biased in an unlatching direction (clockwise direction in FIG. 3 and counterclockwise direction in FIG. 4) by a spring 17 supported by the latch shaft 11.

Moreover, when the seat back 3B is in a position other than the first and second positions and the striker 5 does not enter the striker entering groove 71 of the baseplate 7, the latch 12 stops in an unlatching position shown in FIG. 6. When the striker 5 enters the striker entering groove 71 in conjunction with a rising-up operation of the seat back 3B, the latch 12 pivots from the unlatching position against a biasing force of the spring 17 at a predetermined angle in the latching direction (counterclockwise direction in FIG. 6) to a first latching position shown in FIG. 10 and stops in this position, and further pivots from the first latching position at a predetermined angle in the latching direction to a second latching position shown in FIG. 15 and stops there. Moreover, the latch 12 reversely pivots in the unlatching direction in conjunction with a falling-down operation of the seat back 3B based on an operation of the operation member 6.

The first latching position of the latch 12 corresponds to the first position of the seat back 3B and the striker 5, and the second latching position corresponds to the second position of the seat back 3B and the striker 5.

The latch 12 has:
an engaging groove 123 with which the first leg portion 51 of the striker 5 is capable of engaging;
a first arm portion 121 in the latching direction side of the engaging groove 123 to extend in a centrifugal direction centered on the latch shaft 11;
a second arm portion 122 in the unlatching direction side of the engaging groove 123 to extend in the centrifugal direction centered on the latch shaft 11;
a third arm portion 124 formed between the engaging groove 123 and the second arm portion 122;
a fourth arm portion 126 apart from the first arm portion 121 with a predetermined distance in the latching direction; and
a pushed portion 127 formed on a side surface of the latch 12 to extend in a form of a cylindrical shape in an axis direction of the latch shaft 11.

The latch 12 is made with a core material made of metal, and its surface is covered with a synthetic resin except each tip portion of the first and second arm portions 121, 122 and the pushed portion 127.

The tip portion of the first arm portion 121 has a first unlatching side abutting portion 121a and a first latching side abutting portion 121b. The first unlatching side abutting portion 121a is capable of engaging with the first ratchet 9 in the unlatching direction in the first latching position of the latch 12. The first latching side abutting portion 121b is capable of engaging with a hooking portion 101 described below of the second ratchet 10 in the first latching position of the latch 12. The tip portion of the second arm portion 122 has a second unlatching side abutting portion 122a and a second latching side abutting portion 122b. The second unlatching side abutting portion 122a is capable of engaging with the first ratchet 9 in the unlatching direction in the second latching position of the latch 12. The second latching side abutting portion 122b is capable of engaging with the hooking portion 101 of the second ratchet 10 in the second latching position of the latch 12.

When the latch 12 is the unlatching position, the first arm portion 121 is in an obliquely rearward and upward posture in a state of overlapping with the striker entering groove 71 as shown in FIG. 6. When the latch 12 is in the second latching position, the first arm portion 121 moves to the lower side of the striker entering groove 71 to be off from the striker entering groove 71 and to be in a frontward posture.

When the latch 12 is the unlatching position, the second arm portion 122 is positioned in the lower side of the striker entering groove 71. The second arm portion 122 moves upward in conjunction with the pivot of the latch 12 in the latching direction, and moves to the upper side of the striker entering groove 71 in the second latching position.

When the latch 12 is the unlatching position, the third arm portion 124 is positioned in the lower side of the striker entering groove 71 in a state of an obliquely rearward and upward posture. When the latch 12 pivots to the second latching position, the third arm portion 124 moves to a position to be in a frontward posture in a state of overlapping with the striker entering groove 71, and a tip portion 125 of the third arm portion 124 faces the first abutting portion 191a of the first auxiliary arm portion 191 of the engagement auxiliary lever 19.

When the latch 12 pivots to the second latching position, the first leg portion 51 of the striker 5 is clamped between the tip portion 125 of the third arm portion 124 and the first abutting portion 191a of the engagement auxiliary lever 19.

The engaging groove 123 is formed between the first arm portion 121 and the third arm portion 124, and is positioned to overlap with the striker entering groove 71 when the latch 12 is the unlatching position. When the first leg portion 51 of the striker 5 enters the striker entering groove 71 in conjunction with the rising-up operation of the seat back 3B, the engaging groove 123 engages with the first leg portion 51. Accordingly, the latch 12 pivots in the latching direction from the unlatching position to the first latching position shown in FIG. 10. When the first leg portion 51 of the striker 5 further enters the striker entering groove 71 deeply to abut with the first abutting portion 191a of the first auxiliary arm portion 191 of the engagement auxiliary lever 19, the engagement auxiliary lever 19 pivots from the standby position in the entering direction and the second auxiliary arm portion 192 abuts with the pushed portion 127 of the latch 12. Thus, the latch 12 pivots to a position before the second latching position shown in FIG. 14 or the second latching position shown in FIG. 15. In the first example, the latch 12 is configured to pivot to the position before the second latching position when the second auxiliary arm portion 192 is abutted with the pushed portion 127 of the latch 12, and to pivot from the position before the second latching position to the second latching position by a cam portion 92 described below formed on the first ratchet 9.

The pushed portion 127 is formed on the side surface of the third arm portion 124 of the latch 12 to extend in the form of the cylindrical shape in the axis direction of the latch shaft 11. The pushed portion 127 is positioned in the lower side of the striker entering groove 71 when the latch 12 is in the unlatching position, and moves to a position to overlap with the striker entering groove 71 when the latch 12 reaches to a position before the first latching position.

Figure 10:
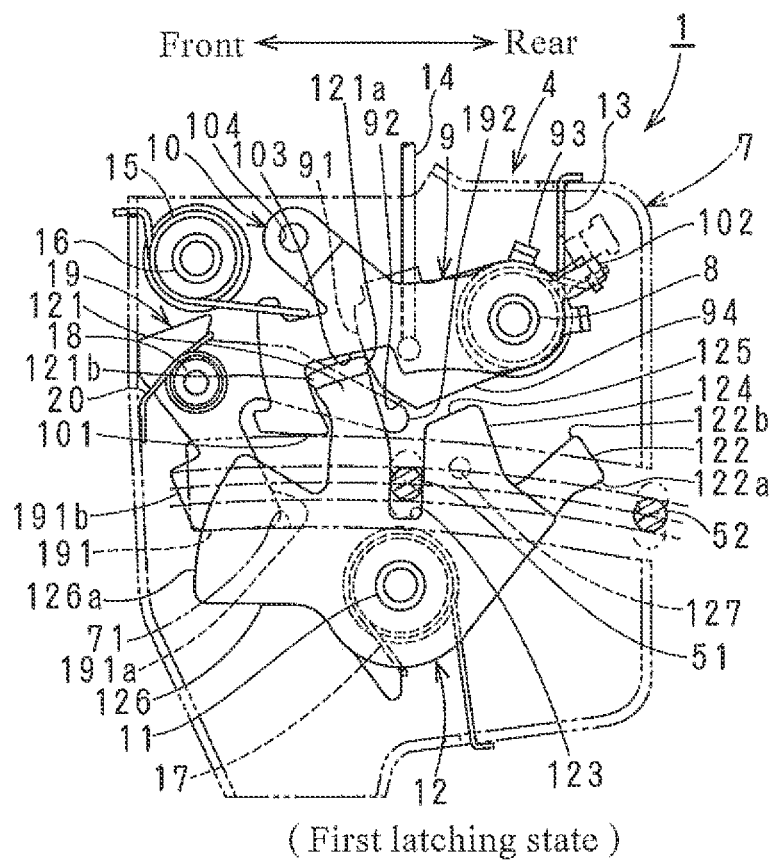
FIG. 10 is an explanatory drawing showing the first latching state of the locking mechanism of the first example.

The first ratchet 9 has an engaging portion 91 formed on its front edge and the cam portion 92 continuously formed on a lower portion of the engaging portion 91. When the latch 12 is in the first latching position, the engaging portion 91 engages with the first arm portion 121 to prevent the latch 12 from pivoting from the first latching position in the unlatching direction as shown in FIG. 10. When the latch 12 is in the second latching position, the engaging portion 91 engages with the second arm portion 122 to prevent the latch 12 from pivoting from the second latching position in the unlatching direction as shown in FIG. 15.

Moreover, when the engaging portion 91 pivots in the releasing direction (clockwise direction) based on the operation of the operation member 6 from an engagement position where the engaging portion 91 engages with the first arm portion 121 or the second arm portion 122, the engaging portion 91 comes off from the first arm portion 121 or the second arm portion 122, and the first ratchet 9 allows the latch 12 to pivot in the unlatching direction.

Figure 11:
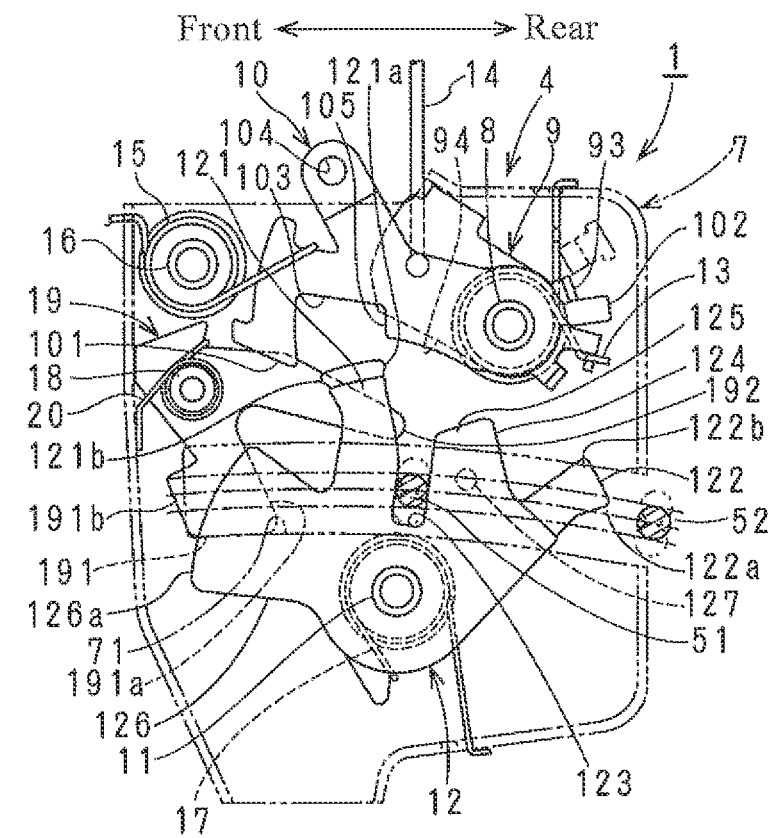
FIG. 11 is an explanatory drawing showing an unlatching operation from the first latching state of the locking mechanism of the first example.
Figure 15:
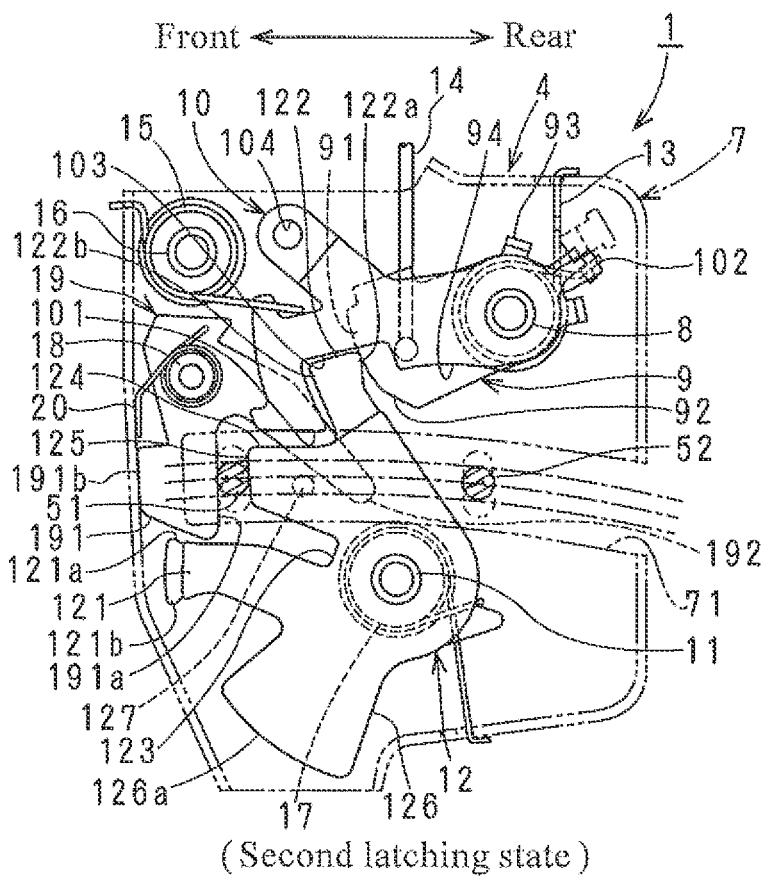
FIG. 15 is an explanatory drawing showing the second latching state of the locking mechanism of the first example.
Figure 16:
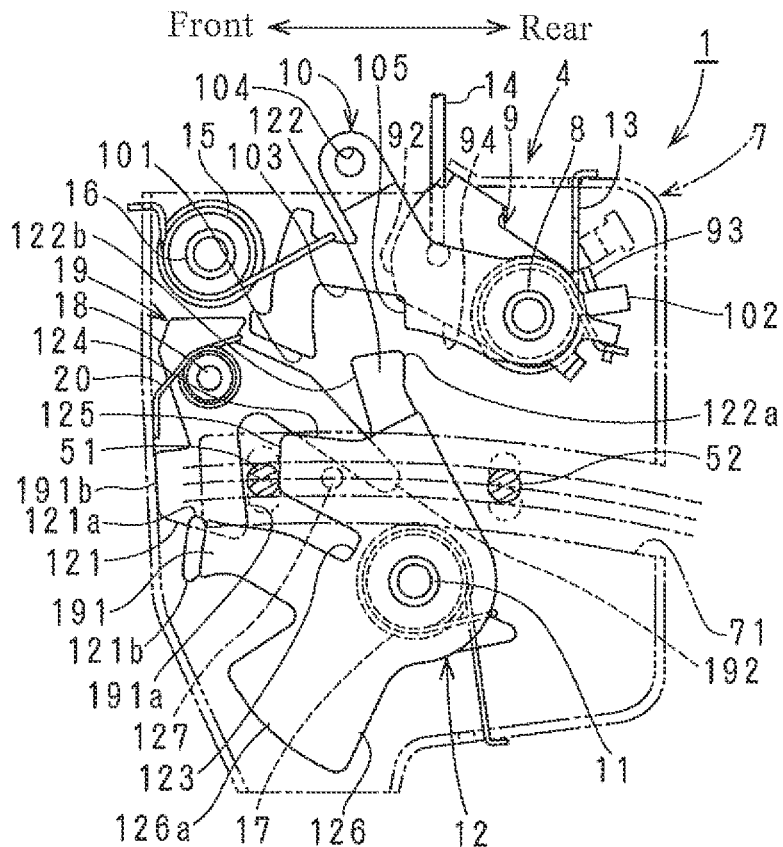
FIG. 16 is an explanatory drawing showing an unlatching operation from the second latching state of the locking mechanism of the first example.

In the following description, the placed state of a lower edge of the first ratchet 9 on a peripheral portion 126a of the latch 12 as shown in FIGS. 3, 4, 6 is defined as that the first ratchet 9 is in the standby position; the engagement state of the engaging portion 91 with the first arm portion 121 or the second arm portion 122 as shown in FIGS. 10, 15 is defined as that the first ratchet 9 is in the engagement position; and the come-off state of the engaging portion 91 from the first arm portion 121 or the second arm portion 122 as shown in FIGS. 11, 16 is defined as that the first ratchet 9 is in a releasing operation.

When the cam portion 92 of the first ratchet 9 abuts with the first unlatching side abutting portion 121a of the first arm portion 121 before the first latching position of the latch 12, the first ratchet 9 gives a pivoting force in the latching direction to the latch 12 by the biasing force of the spring 13 acting on the first ratchet 9 to make the latch 12 pivot forcibly to the first latching position. When the cam portion 92 of the first ratchet 9 abuts with the second unlatching side abutting portion 122a of the second arm portion 122 before the second latching position of the latch 12, the first ratchet 9 gives the pivoting force in the latching direction to the latch 12 by the biasing force of the spring 13 acting on the first ratchet 9 to make the latch 12 pivot forcibly from the position before the second latching position to the second latching position.

The second ratchet 10 has the hooking portion 101 protruding downward from its front end portion to be positioned apart from the engaging portion 91 of the first ratchet 9 with a predetermined distance in the latching direction. Thus, a restraining portion 103 is formed between the hooking portion 101 and the engaging portion 91 of the first ratchet 9, wherein the first arm portion 121 engages with the restraining portion 103 in the first latching position of the latch 12 and the second arm portion 122 engages with the restraining portion 103 in the second latching position of the latch 12. The restraining portion 103 is formed with a downward opening of which width is the same as or slightly larger than each width of the tip portions of the first and second arm portions 121, 122. When each of the tip portions of the first and second arm portions 121, 122 engages with the restraining portion 103, the restraining portion 103 prevents the latch 12 from pivoting in both the latching and unlatching directions and holds the latch 12 in the respective first and second latching positions.

An indicator (not shown) by which an engagement state of the locking mechanism 4 is possible to be seen is coupled with an indicator connection portion 104 of the second ratchet 10. The indicator is provided in the seat back 3B.

Figure 9:
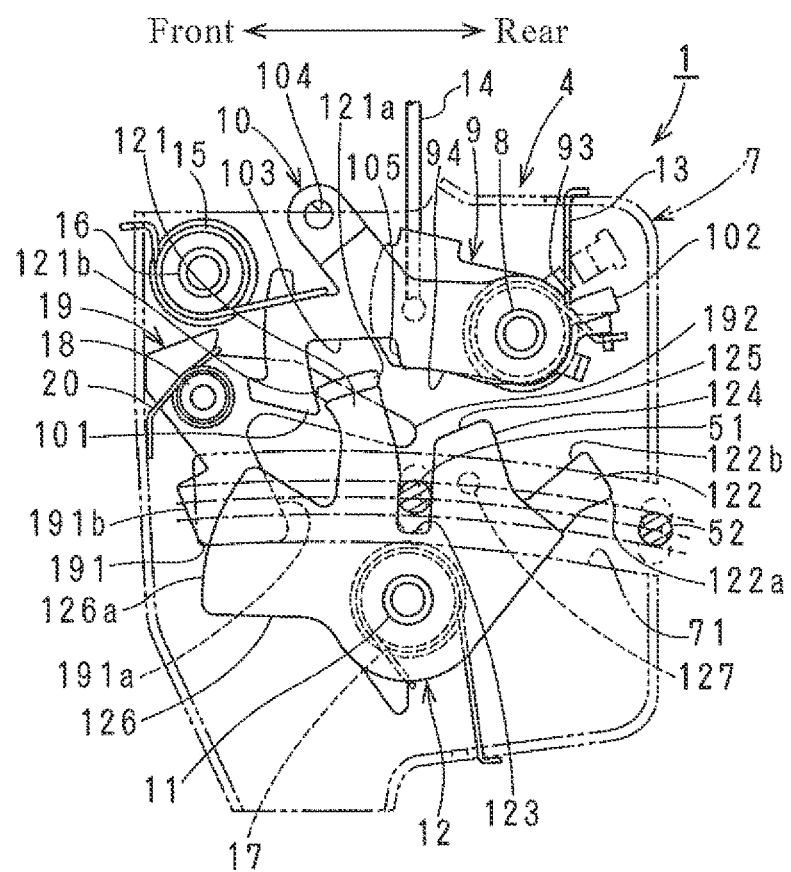
FIG. 9 is an explanatory drawing showing a third state in the middle of the operation from the unlatching state to the first latching state of the locking mechanism of the first example.
Figure 14:
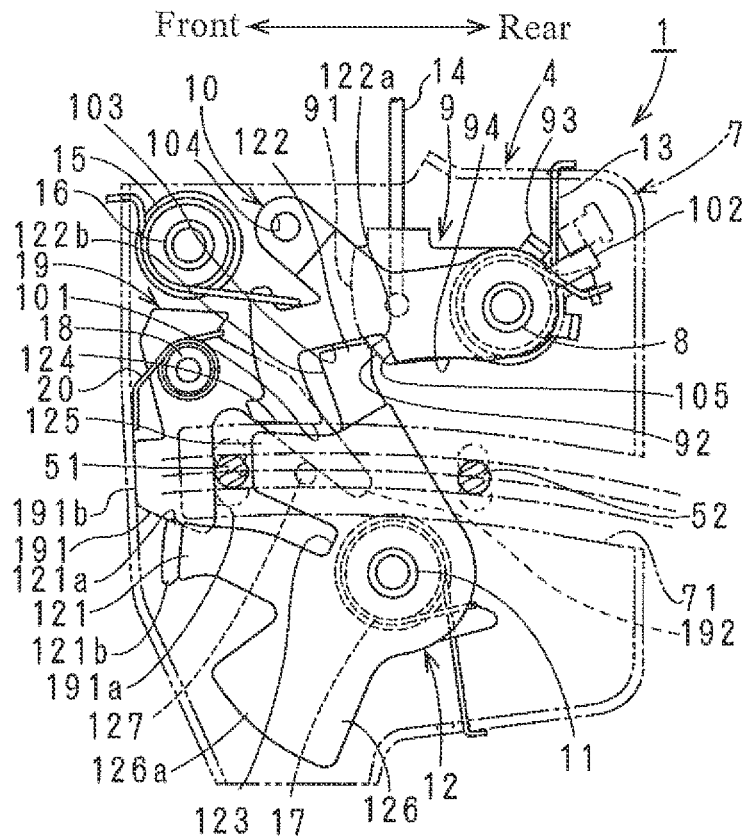
FIG. 14 is an explanatory drawing showing a sixth state in the middle of the operation from the first latching state to the second latching state of the locking mechanism of the first example.

When the latch 12 is in the unlatching position, the hooking portion 101 abuts with the peripheral portion 126a of the fourth arm portion 126 of the latch 12. When the latch 12 pivots from the unlatching position in the latching direction, the hooking portion 101 abuts with the first arm portion 121 of the latch 12 to stop the latch 12 in the first latching position as shown in FIG. 9 and moves to the position to completely engage with the first arm portion 121 by the biasing force of the spring 15 as shown in FIG. 10. When the latch 12 pivots from the first latching position or a position before there according to the operation of the operation member 6, the hooking portion 101 abuts with the second arm portion 122 of the latch 12 to stop the latch 12 in the position before the second latching position as shown in FIG. 14 and moves to the same position as shown in FIG. 10 by the biasing force of the spring 15 as shown in FIG. 15. In this manner, since the positions of the hooking portion 101 of the second ratchet 10 are shifted each other between the state where the latch 12 is in the unlatching position and the state where the latch 12 is in the first and second latch positions, it is possible to surely confirm the engagement state of the second ratchet 10 against the latch 12 by the indicator.

Moreover, when the second ratchet 10 pivots at a predetermined angle in the releasing direction based on the operation of the operation member 6, the second ratchet 10 allows the latch 12 to pivot in the latching direction by releasing the hooking portion 101 from the first arm portion 121 or the second arm portion 122 of the latch 12. However, when the latch 12 is in the second latching position, the latch 12 is not made to pivot in the latching direction substantially because the tip portion 125 of the third arm portion 124 is abutted with the first abutting portion 191a of the first auxiliary arm portion 191 of the engagement auxiliary lever 19 stopped in the restraining position while the first leg portion 51 of the striker 5 is clamped between the tip portion 125 and the first abutting portion 191a.

In the following description, the placed state of the hooking portion 101 of the second ratchet 10 on the peripheral portion 126a of the latch 12 as shown in FIGS. 3, 4, 6 is defined as that the second ratchet 10 is in the standby position; the complete engagement state of the hooking portion 101 with the first arm portion 121 or the second arm portion 122 as shown in FIGS. 10, 15 is defined as that the second ratchet 10 is in the engagement position; and the come-off state of the hooking portion 101 from the first arm portion 121 or the second arm portion 122 as shown in FIGS. 11, 16 is defined as that the second ratchet 10 is in a releasing operation.

Based on FIGS. 6 to 17, the working of the vehicle seat locking device 1 of the first example is explained as follows.

Figure 8:
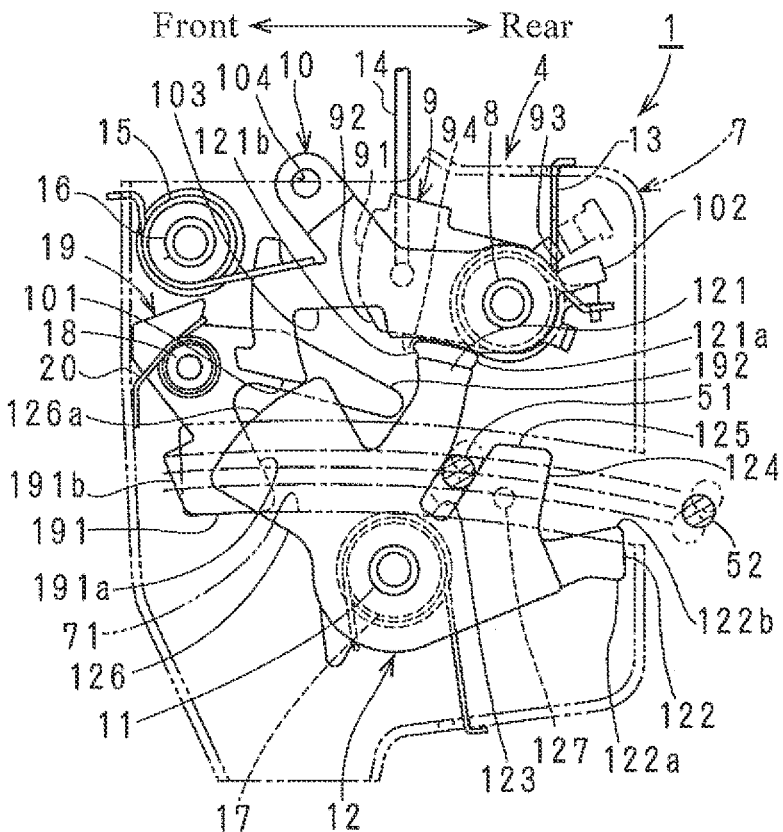
FIG. 8 is an explanatory drawing showing a second state in the middle of the operation from the unlatching state to the first latching state of the locking mechanism of the first example.
Figure 12:
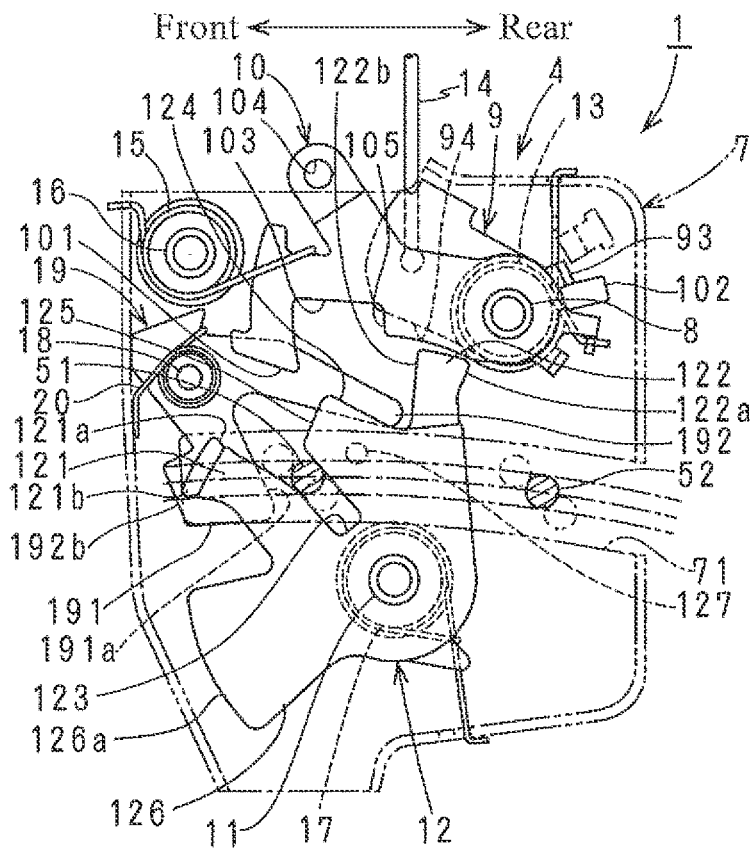
FIG. 12 is an explanatory drawing showing a fourth state in the middle of the operation from the first latching state to a second latching state of the locking mechanism of the first example.
Figure 13:
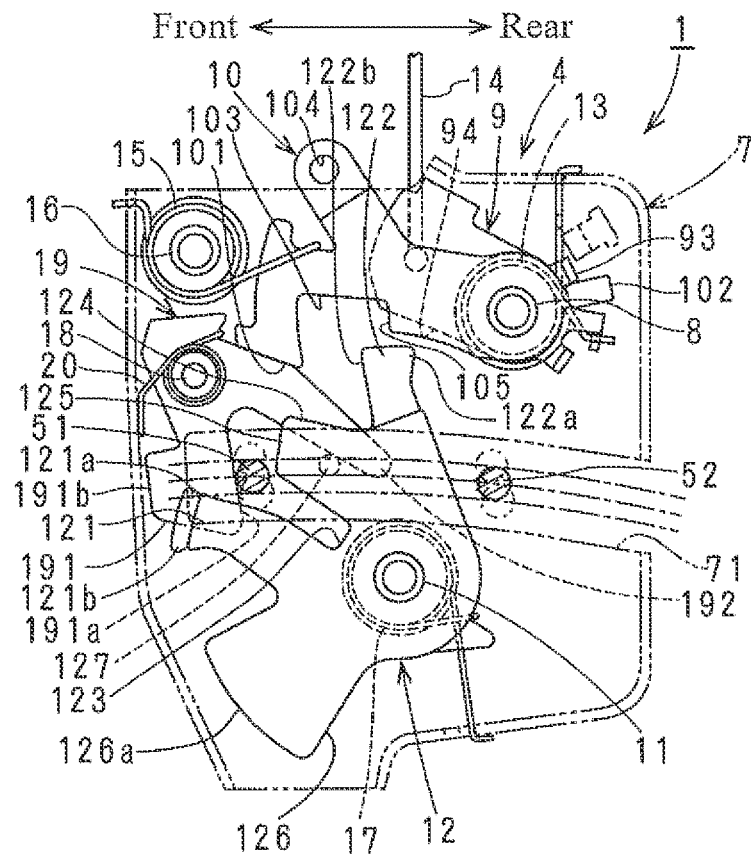
FIG. 13 is an explanatory drawing showing a fifth state in the middle of the operation from the first latching state to the second latching state of the locking mechanism of the first example.
Figure 17:
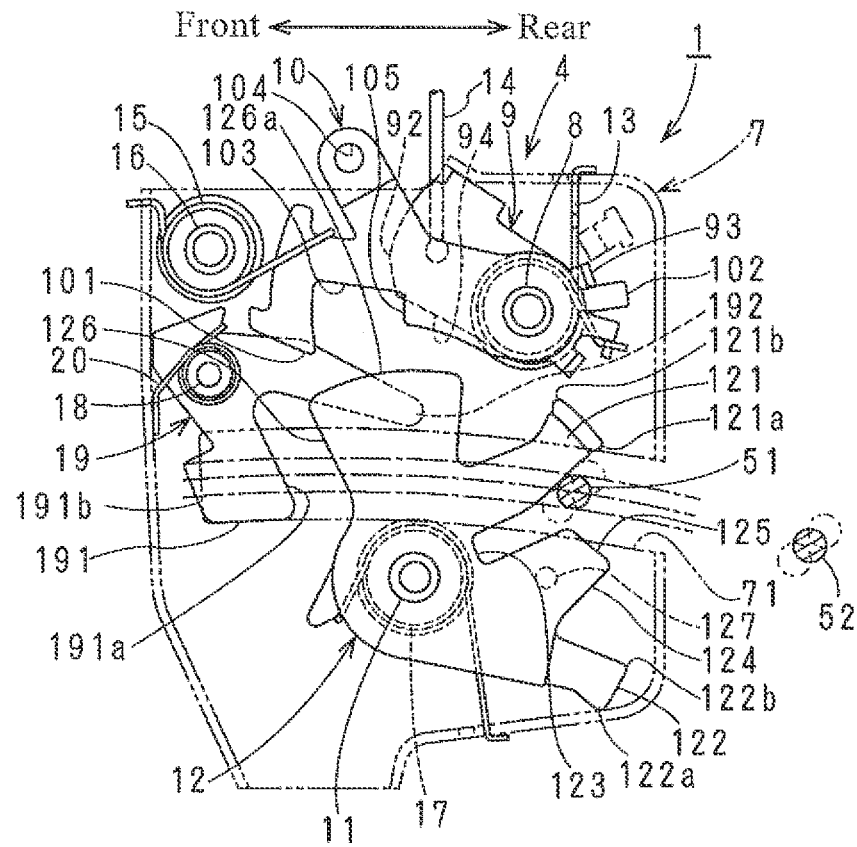
FIG. 17 is an explanatory drawing showing a state after the unlatching operation of the locking mechanism of the first example.
Figure 18:
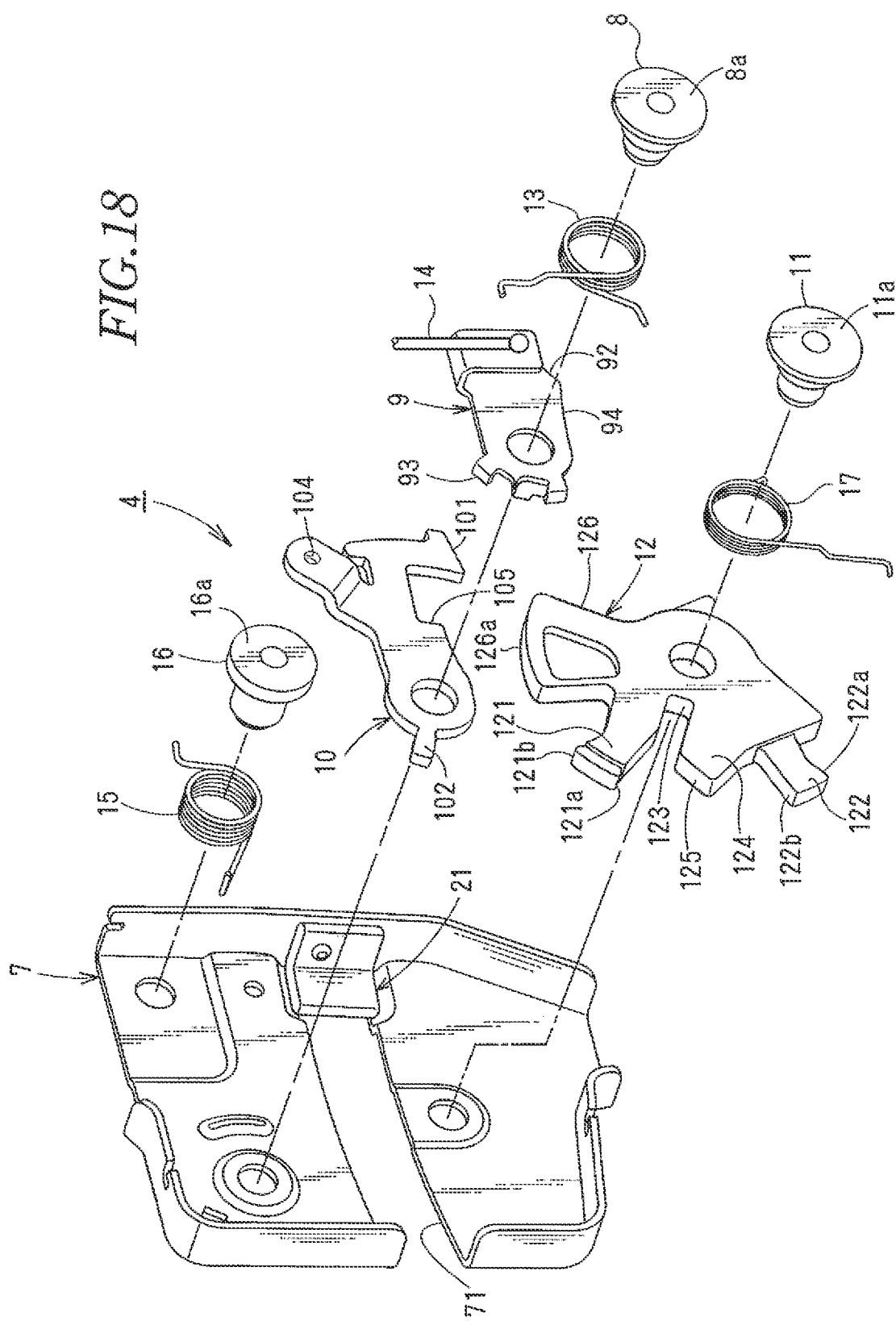
FIG. 18 is an exploded perspective view showing a locking mechanism of the second example.

FIG. 6 is an explanatory drawing showing an unlatching state of the locking mechanism 4. FIG. 7 is an explanatory drawing showing a first state in the middle of an operation from the unlatching state to a first latching state of the locking mechanism 4. FIG. 8 is an explanatory drawing showing a second state in the middle of the operation from the unlatching state to the first latching state of the locking mechanism 4. FIG. 9 is an explanatory drawing showing a third state in the middle of the operation from the unlatching state to the first latching state of the locking mechanism 4. FIG. 10 is an explanatory drawing showing the first latching state of the locking mechanism 4. FIG. 11 is an explanatory drawing showing an unlatching operation from the first latching state of the locking mechanism 4. FIG. 12 is an explanatory drawing showing a fourth state in the middle of the operation from the first latching state to a second latching state of the locking mechanism 4. FIG. 13 is an explanatory drawing showing a fifth state in the middle of the operation from the first latching state to the second latching state of the locking mechanism 4. FIG. 14 is an explanatory drawing showing a sixth state in the middle of the operation from the first latching state to the second latching state of the locking mechanism 4. FIG. 15 is an explanatory drawing showing the second latching state of the locking mechanism 4. FIG. 16 is an explanatory drawing showing an unlatching operation from the second latching state of the locking mechanism 4. FIG. 17 is an explanatory drawing showing a state after the unlatching operation of the locking mechanism 4.

(In the Case of Moving the Seat Back 3B from the Falling-Down Position to the First Position)

When the seat back 3B is in the falling-down position, as shown in FIG. 6, the latch 12 is held in the unlatching position and the first and second ratchets 9, 10 and the engagement auxiliary lever 19 are held in the respective standby positions.

When the seat back 3B is risen-up from the falling-down position, the first leg portion 51 of the striker 5 is made to enter the striker entering groove 71 to abut with the first arm portion 121 of the latch 12. Thus, as shown in FIG. 7, the latch 12 pivots from the unlatching position in the latching direction against the biasing force of the spring 17. When the latch 12 pivots in the latching direction, the first leg portion 51 of the striker 5 engages with the engaging groove 123 of the latch 12, and the tip portion of the first arm portion 121 of the latch 12 approaches a lower edge portion 94 of the first ratchet 9.

When the latch 12 further pivots in the latching direction while the first leg portion 51 of the striker 5 is engaging with the engaging groove 123, as shown in FIG. 8, the tip portion of the first arm portion 121 of the latch 12 contacts the lower edge portion 94 of the first ratchet 9. Thus, in conjunction with the pivot of the latch 12 in the latching direction, the tip portion of the first arm portion 121 pivots while slidingly contacting with the lower edge portion 94 of the first ratchet 9 to hold the first ratchet 9 in the standby position. Incidentally, in this situation, the second ratchet 10 is held in the standby position.

In the case that the first and second leg portions 51, 52 of the striker 5 are made to enter the striker entering groove 71 of the baseplate 7, even if the entering position of the striker 5 to the striker entering groove 71 of the baseplate 7 is shifted from the standard position in the vertical direction owing to the mounting position tolerance of the rear seat 2, looseness of moving parts of the seat back 3B and so forth, when each shift of movement loci of the first and second leg portions 51, 52 of the striker 5 is within a predetermined permissible range, the first and second leg portions 51, 52 of the striker 5 are allowed to enter the striker entering groove 71. Thus, even if there is a slight shift in the vertical direction between the mounting positions of the locking mechanism 4 and the striker 5, it is possible to surely engage the first leg portion 51 of the striker 5 with the engaging groove 123 of the latch 12.

When the latch 12 further pivots in the latching direction, as shown in FIG. 9, the hooking portion 101 of the second ratchet 10 comes off from the peripheral portion 126a of the latch 12, and the tip portion of the first arm portion 121 of the latch 12 comes off from the lower edge portion 94 of the first ratchet 9. Thus, the first and second ratchets 9, 10 are made to be pivotable to the respective engagement positions by the respective biasing forces of the springs 13, 15, and the first arm portion 121 of the latch 12 is abutted with the hooking portion 101. Thus, the latch 12 is stopped in the first latching position to be prevented from further pivoting in the latching direction.

When the latch 12 is stopped in the first latching position, as shown in FIG. 10, the first ratchet 9 is made to pivot to the engagement position by the biasing force of the spring 13, and the second ratchet 10 is made to pivot to the engagement position by the biasing force of the spring 15. Thus, the first arm portion 121 of the latch 12 is engaged with the restraining portion 103 formed by the first and second ratchets 9, 10 to be prevented from pivoting in the latching and unlatching directions from the first latching position of the latch 12. Accordingly, the latch 12 is restrained in the first latching position, and the striker 5 is restrained in the first position shown in FIG. 10.

When the latch 12 is restrained in the first latching position and the striker 5 is restrained in the first position, as shown in FIG. 10, the engaging groove 123 is overlapped with the striker entering groove 71 in an orthogonal direction to be directed straightly upward. Thus, even if there is a slight shift in the vertical direction between the mounting positions of the locking mechanism 4 and the striker 5, it is possible to surely engage the first leg portion 51 of the striker 5 with the engaging groove 123 of the latch 12 because the first leg portion 51 of the striker 5 is capable of relatively moving in the vertical direction in the engaging groove 123 of the latch 12 such that the shift in the vertical direction is possible to be absorbed. In this state, the second leg portion 52 of the striker 5 slightly enters the striker entering groove 71.

The operation when the first ratchet 9 pivots to the engagement position is described in detail below. Since the cam portion 92 previously abuts with the first arm portion 121 of the latch 12 before the first ratchet 9 reaches the engagement position, the first ratchet 9 makes the latch 12 to forcibly pivot to the first latching position by its pivoting force in the engaging direction based on the biasing force of the spring 13. Thus, the first ratchet 9 makes the latch 12 to surely pivot from the position before the first latching position to the first latching position. After that, the engaging portion 91 of the first ratchet 9 engages with the first arm portion 121 of the latch 12. Thus, it is possible to surely engage the engaging portion 91 of the first ratchet 9 with the first arm portion 121 of the latch 12. Therefore, the latch 12 is surely restrained in the first latching position such that the seat back 3B is possible to be surely held in the first position without looseness.

When a large load is applied to the seat back 3B from rear to front while the seat back 3B is held in the first position, the first ratchet 9 may be forcibly released in the releasing direction owing to that the first arm portion 121 of the latch 12 is engaged with the cam portion 92. However, even if such a situation arises, the first arm portion 121 abuts with a step portion 105 provided on the second ratchet 10 to prevent the latch 12 from pivoting in the unlatching direction, and it is possible to surely restrain the latch 12 in the first latching position.

(In the Case of Moving the Seat Back 3B from the First Position to the Second Position)

When the seat back 3B is held in the first position, as shown in FIG. 10, the latch 12 is restrained in the first latching position, the striker 5 is restrained in the first position, the first and second ratchets 9, 10 are held in the respective engagement positions, and the engagement auxiliary lever 19 is held in the standby position.

When a user operates to release the operation member 6, as shown in FIG. 11, the first ratchet 9 disengages from its engagement position, and in conjunction with this disengagement, the second ratchet 10 disengages from its engagement position, too. Thus, the engaging portion 91 of the first ratchet 9 is made to come off from the first arm portion 121 of the latch 12, the hooking portion 101 of the second ratchet 10 is made to come off from the first arm portion 121 of the latch 12, and the latch 12 is made to be capable of pivoting from the first latching position in the latching and unlatching directions.

Next, the seat back 3B is pushed rearward while the operation member 6 is operated. Thus, as shown in FIG. 12, the first leg portion 51 of the striker 5 moves inward in the striker entering groove 71 to the inner portion while engaging with the engaging groove 123, the latch 12 pivots from the first latching position in the latching direction, and the first leg portion 51 abuts with the first abutting portion 191a of the first auxiliary arm portion 191 of the engagement auxiliary lever 19.

When the latch 12 pivots in the latching direction and the engagement auxiliary lever 19 pivots in the entering direction in conjunction with further entering movement of the first leg portion 51, as shown in FIG. 13, at the substantially same time that the engaging groove 123 of the latch 12 shifts in an obliquely upward posture to make the first leg portion 51 of the striker 5 exit from the engaging groove 123, the third arm portion 124 of the latch 12 overlaps with the striker entering groove 71 while being in a frontward posture, and the engagement auxiliary lever 19 pivots from the standby position in the entering direction. Accordingly, the second auxiliary arm portion 192 abuts with the pushed portion 127 of the latch 12 in the pivoting direction and pushes the pushed portion 127 to make the latch 12 pivot in the latching direction in conjunction with the pivot of the engagement auxiliary lever 19 in the entering direction.

When the first leg portion 51 of the striker 5 further moves inward in the striker entering groove 71, as shown in FIG. 14, the first leg portion 51 completely exits from the engaging groove 123 of the latch 12 and the engagement auxiliary lever 19 stops in the restraining position by abutting the second abutting portion 191b of the first auxiliary arm portion 191 with the baseplate 7.

When the engagement auxiliary lever 19 pivots to the position shown in FIG. 14, the latch 12 pivots to the position before the second latching position. When the latch 12 pivots to the position before the second latching position, the cam portion 92 of the first ratchet 9 abuts with the second unlatching side abutting portion 122a of the second arm portion 122 of the latch 12 to make the latch 12 forcibly pivot from the position before the second latching position to the second latching position by the biasing force of the spring 13 acting on the first ratchet 9, and the latch 12 stops in the second latching position by abutting the tip portion 125 of the third arm portion 124 with the first leg portion 51 as shown in FIG. 15.

When the latch 12 stops in the second latching position after pivoting, the first leg portion 51 completely exits from the engaging groove 123 of the latch 12 to be clamped between the first abutting portion 191a capable of elastically deforming of the engagement auxiliary lever 19 and the tip portion 125 of the third arm portion 124 of the latch 12. Then, the second ratchet 10 pivots to its engagement position by the biasing force of the spring 15, and the first ratchet 9 pivots to its engagement position by the biasing force of the spring 13. Thus, the second arm portion 122 of the latch 12 engages with the restraining portion 103 formed by the first and second ratchets 9, 10 to prevent the latch 12 from pivoting in the unlatching and latching directions. Thus, the striker 5 is restrained in the second position shown in FIG. 15 to hold the seat back 3B in the second position.

In the state that the latch 12 is restrained in the second latching position and the striker 5 is restrained in the second position, the first leg portion 51 is surely restrained in the striker entering groove 71 without looseness because the first leg portion 51 of the striker 5 is clamped between the tip portion 125 of the third arm portion 124 of the latch 12 and the first abutting portion 191a that is opposite to the second abutting portion 191b abutting with the baseplate 7. Moreover, since a portion including the first and second abutting portions 191a, 191b is made to be capable of elastically deforming, the first leg portion 51 of the striker 5 is possible to be surely restrained.

When a large load is applied to the seat back 3B from rear to front while the seat back 3B is held in the second position, the first ratchet 9 may be forcibly released in the releasing direction owing to that the second arm portion 122 of the latch 12 is engaged with the cam portion 92. However, even if such a situation arises, the second arm portion 122 abuts with the step portion 105 provided on the second ratchet 10 to prevent the latch 12 from pivoting in the unlatching direction, and it is possible to surely restrain the latch 12 in the second latching position.

As described above, in the first example, since the striker 5 is possible to be restrained in the first and second positions by the single latch 12, it is possible to reduce a number of parts and simplify the configuration of a vehicle seat locking device compared to the prior art.

(In the Case of Moving the Seat Back 3B from the Second Position (or the First Position) to the Falling-Down Position)

When the seat back 3B is held in the second position (or the first position), the vehicle seat locking device 1 is in the state as shown in FIG. 15 (or FIG. 10). When the operation member 6 is operated in such a state, as shown in FIG. 16 (or FIG. 11), the first and second ratchets 9, 10 are released to allow the latch 12 to pivot in the unlatching direction.

When the seat back 3B is moved frontward from the second position, as shown in FIG. 17, the first and second leg portions 51, 52 of the striker 5 are made to exit from the striker entering groove 71. Thus, the latch 12 pivots from the second latching position in the unlatching position and the engagement auxiliary lever 19 pivots to the standby position. Accordingly, it is possible to move the seat back 3B from the second position (or the first position) to the falling-down position. When the seat back 3B is moved frontward from the first position, although a drawing is omitted, the first leg portion 51 of the striker 5 is made to exit from the striker entering groove 71, and thus the latch 12 is made to pivot from the first latching position to the unlatching position. Accordingly, it is possible to move the seat back 3B from the first position to the falling-down position.

As described above, the foregoing relates to the first example of the present invention, but the present invention is not limited to the above first example and various changes and modifications may be added to the first example without departing from the gist of the present invention as follows.

(a) The locking mechanism 4 is fixed to the vehicle body side and the striker 5 is fixed to the seat back 3B side.

(b) The ratchet is made to be an integral form of the first ratchet 9 and the second ratchet 10.

(c) A tip portion (the portion including the first and second abutting portions 191a, 191b) of the first auxiliary arm portion 191 of the engagement auxiliary lever 19 is provided with an elastic member made of rubber and so forth. Alternatively, a cavity is formed in the tip portion such that the tip portion is easily deformed elastically.

(d) The engaging rod of the striker 5 is made to have a single leg portion formed in a bar-shape to fit into the engaging groove 123 of the latch 12. Preferably, a flange portion is provided on a tip portion of the bar-shaped leg portion such that the flange portion of the leg portion is engaged with a periphery of the engaging groove 123 of the latch 12 in the axis direction of the latch shaft 12 while the leg portion is fitted into the engaging groove 123 of the latch 12.

(e) The engagement auxiliary lever 19 is configured to be divided into a first and second auxiliary levers such that the first auxiliary lever is provided with the first auxiliary arm portion 191 and the second auxiliary lever is provided with the second auxiliary arm portion 192.

The second example according to the present invention is described with FIG. 18 to FIG. 33 as follows.

Regarding the vehicle seat locking device 1 of the second example, portions identical or substantially identical to those in the first example are respectively indicated in the drawings with the same reference signs as those used in the first example and their detailed explanations are omitted.

As shown in FIGS. 18 to 21, the locking mechanism 4 has the baseplate 7, the ratchet including the first and second ratchets 9, 10, the latch 12, and a stopper 21 fixed to the baseplate 7.

The stopper 21 is fixed to the inner portion of the striker entering groove 71 of the baseplate 7. The stopper 21 is formed with an elastic material such as rubber or a synthetic resin, and its side surface facing the entering direction of the striker 5 (rear surface) is positioned slightly projecting rearward from an inner end of the striker entering groove 71 such that the first leg portion 51 of the striker 5 entered in the striker entering groove 71 is capable of abutting with the stopper 21. Thus, it is possible to reduce an abutting noise between the first leg portion 51 of the striker 5 and the stopper 21. Moreover, when the stopper 21 is formed with an elastic material such as a soft synthetic resin or rubber, it is capable of surely reducing occurrence of the abutting noise.

In FIGS. 22 to 33, the first and second leg portions 51, 52 shown by a solid line are respectively in the standard positions, and the first and second leg portions 51a, 52a shown by a two-dot chain line (see FIG. 22) are respectively in shifted positions from the standard positions in the vertical direction owing to a mounting position tolerance of the rear seat 2, looseness of moving parts of the seat back 3B and so forth. Moreover, a path X shown by a dashed line (see FIG. 22) indicates each standard entering locus of the first and second leg portions 51, 52 to the striker entering groove 71 of the baseplate 7 in the standard position, and paths X1, X2 (see FIG. 22) shown by a dashed line indicate respective entering loci of the first and second leg portions 51a, 52a to the striker entering groove 71 of the baseplate 7 when the shifts are occurred in the vertical direction.

The latch 12 has the engaging groove 123, the first arm portion 121, the second arm portion 122, the third arm portion 124, a pushed portion 127 provided on the unlatching side of the second arm portion 122, and the fourth arm portion 126.

When the latch 12 is the unlatching position, the third arm portion 124 is positioned in the lower side of the striker entering groove 71 in a state of an obliquely rearward and upward posture. When the latch 12 pivots to the second latching position, the third arm portion 124 moves to a position to be in a frontward posture in a state of overlapping with the striker entering groove 71 and a tip portion 125 of the third arm portion 124 faces the stopper 21.

When the latch 12 is made to pivot to the second latching position, the first leg portion 51 of the striker 5 is clamped between the tip portion 125 of the third arm portion 124 and the stopper 21.

When the latch 12 is in the unlatching position, the engaging groove 123 is in a position to overlap with the striker entering groove 71. When the first leg portion 51 of the striker 5 enters the striker entering groove 71 in conjunction with the rising-up operation of the seat back 3B, the engaging groove 123 engages with the first leg portion 51. Accordingly, the latch 12 pivots in the latching direction from the unlatching position to the first latching position shown in FIG. 26. When the first leg portion 51 of the striker 5 further enters the striker entering groove 71 deeply, the second leg portion 52 of the striker 5 entered the striker entering groove 71 abuts with the pushed portion 127 of the latch 12. Thus, the latch 12 pivots to the position before the second latching position shown in FIG. 30 or the second latching position shown in FIG. 31. In the second example, the latch 12 is configured to pivot to the position before the second latching position when the second leg portion 52 of the striker 5 is abutted with the pushed portion 127 of the latch 12, and to pivot from the position before the second latching position to the second latching position by the cam portion 92 described below formed on the first ratchet 9.

The pushed portion 127 is formed in the unlatching direction side of the second arm portion 122, and is positioned in the lower side of the striker entering groove 71 when the latch 12 is in the unlatching position. When the latch 12 reaches to a position before the second latching position, the pushed portion 127 moves to a position to overlap with the striker entering groove 71 to be in a state that the second leg portion 52 of the striker 5 is capable of abutting with it.

Figure 19:
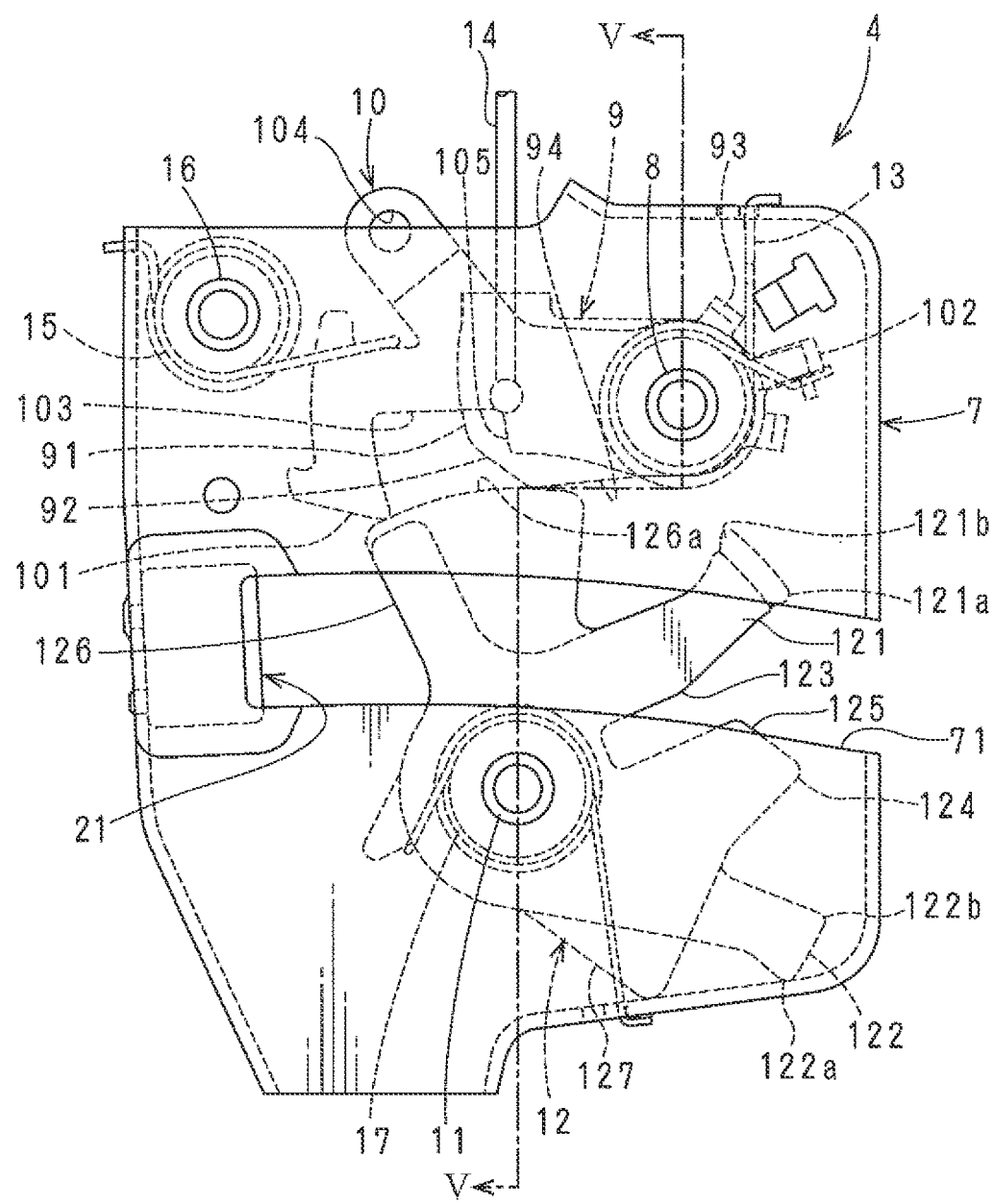
FIG. 19 is a left-side elevational view showing the locking mechanism of the second example.
Figure 20:
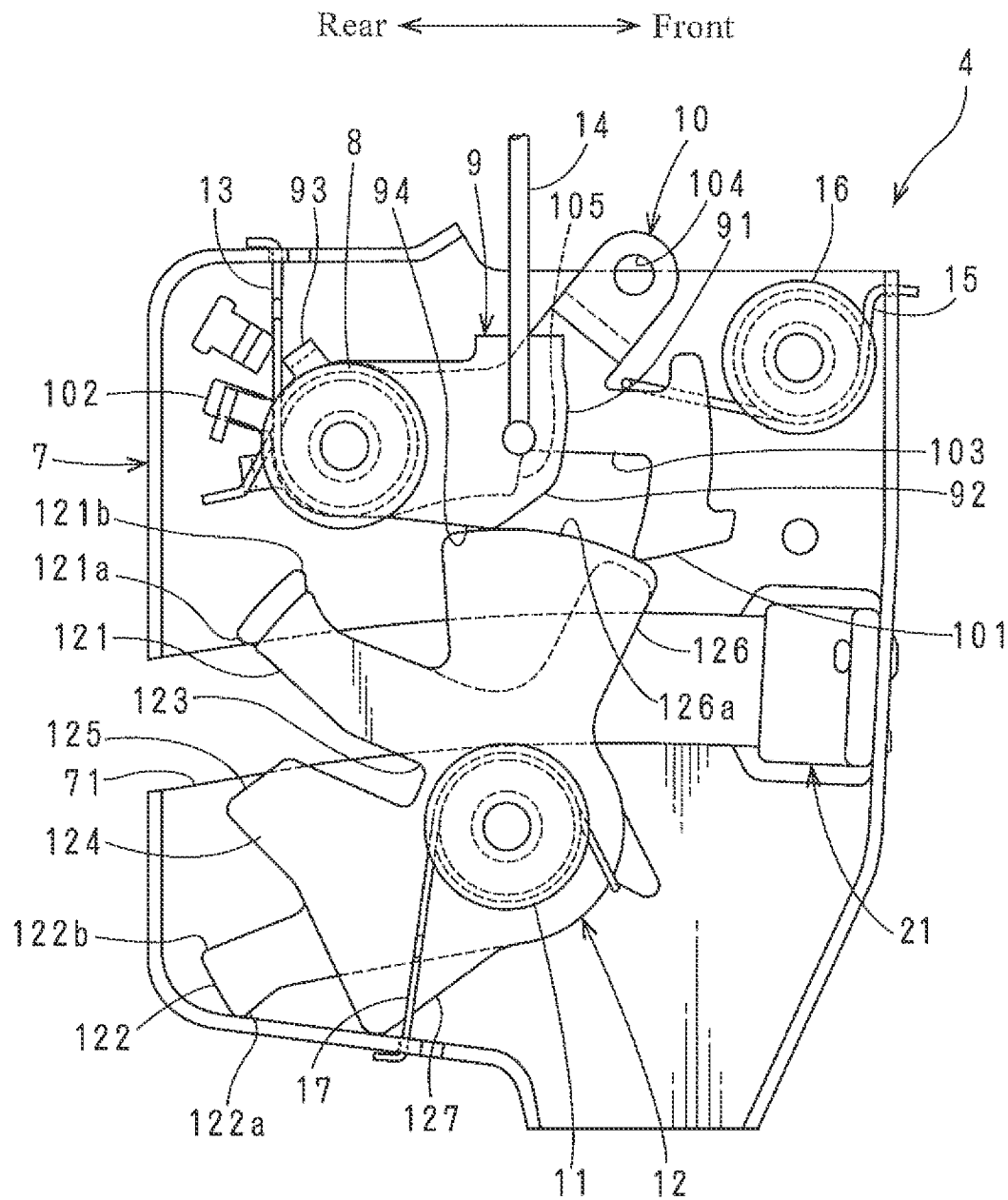
FIG. 20 is a right-side elevational view showing the locking mechanism of the second example.
Figure 21:
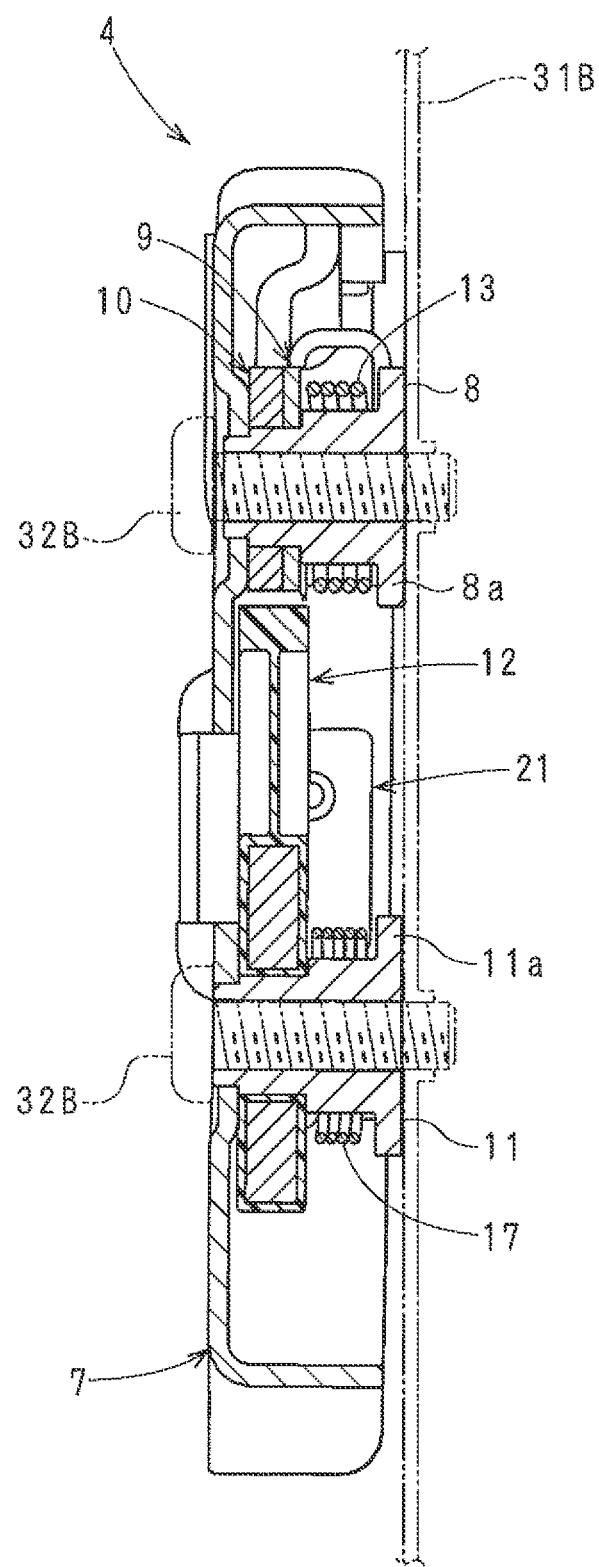
FIG. 21 is a sectional view taken along the line V-V in FIG. 19.
Figure 22:
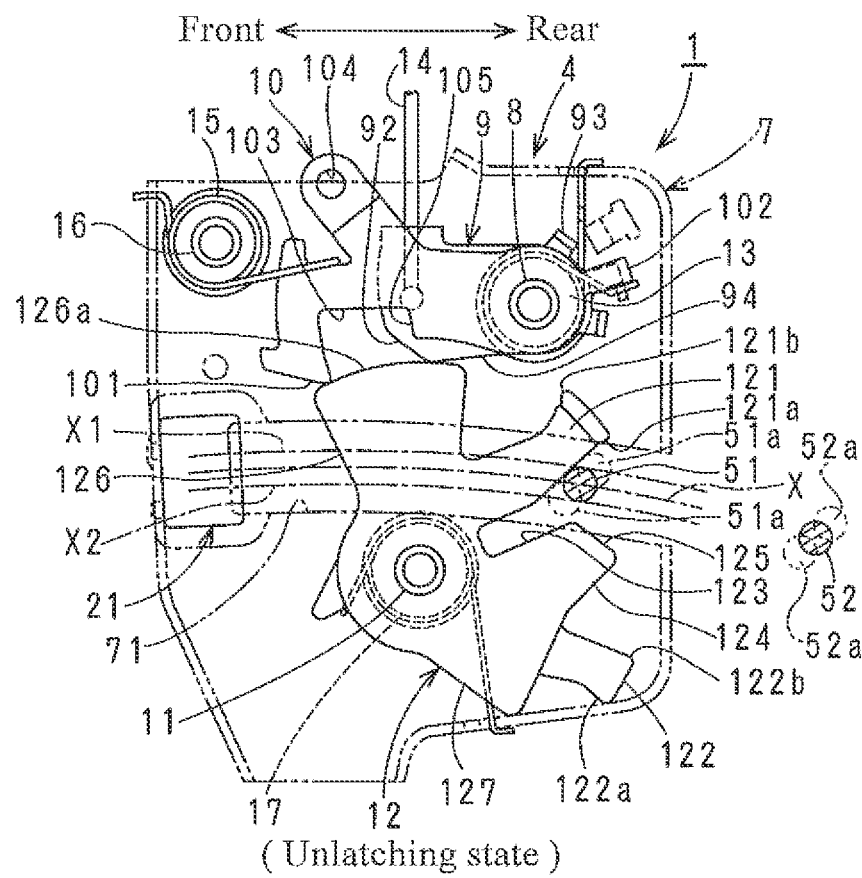
FIG. 22 is an explanatory drawing showing an unlatching state of the locking mechanism of the second example.
Figure 26:
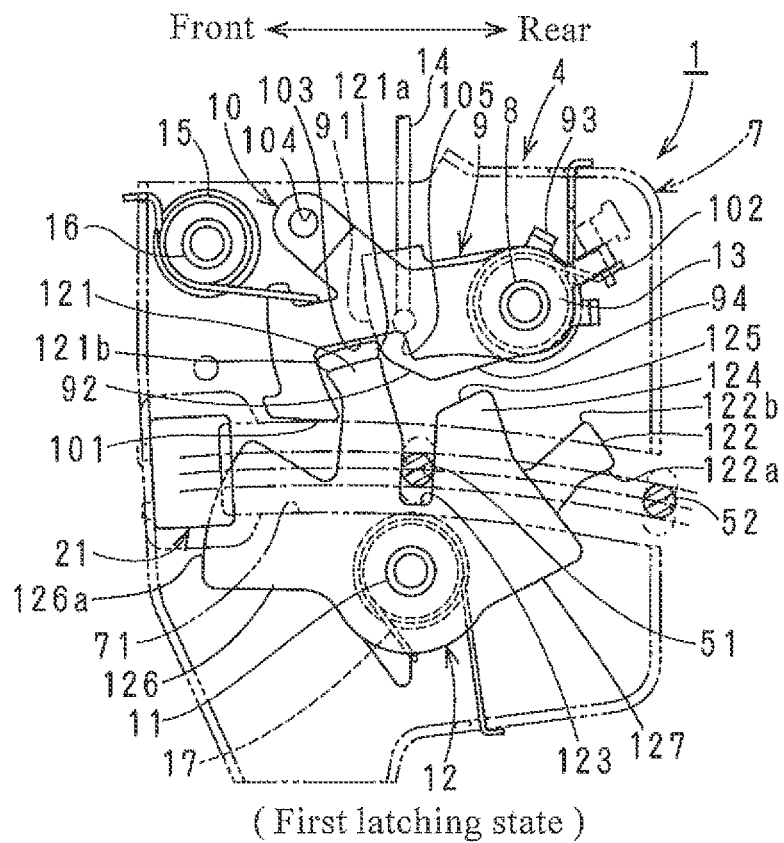
FIG. 26 is an explanatory drawing showing the first latching state of the locking mechanism of the second example.
Figure 27:
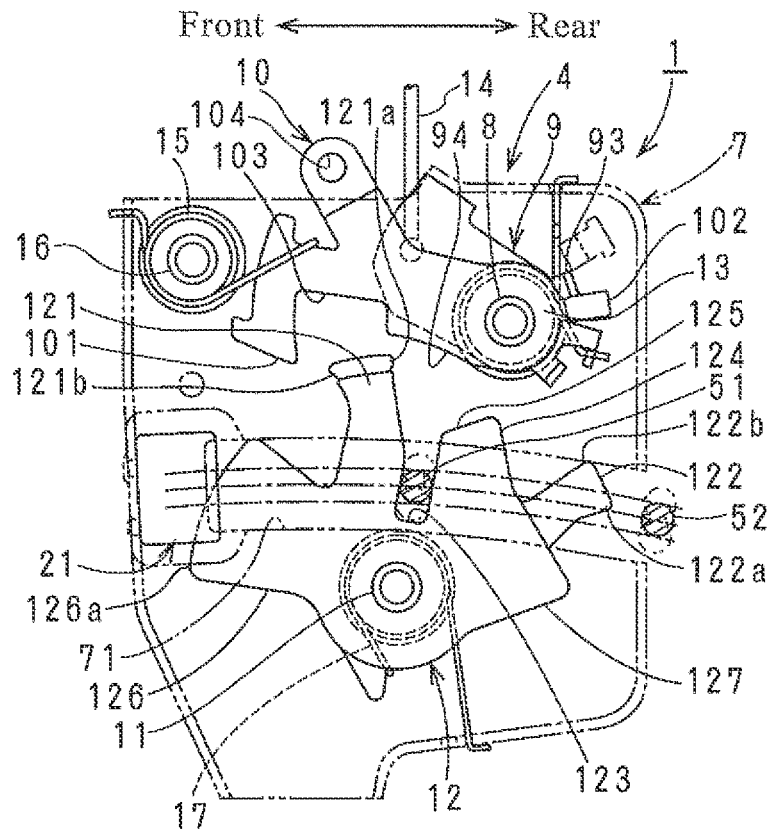
FIG. 27 is an explanatory drawing showing an unlatching operation from the first latching state of the locking mechanism of the second example.
Figure 31:
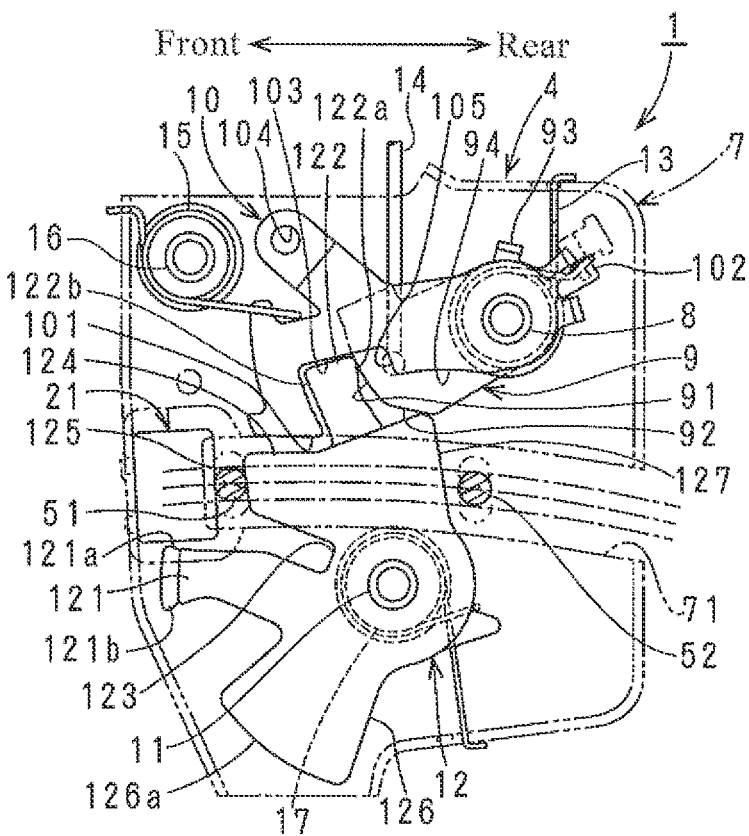
FIG. 31 is an explanatory drawing showing the second latching state of the locking mechanism of the second example.
Figure 32:
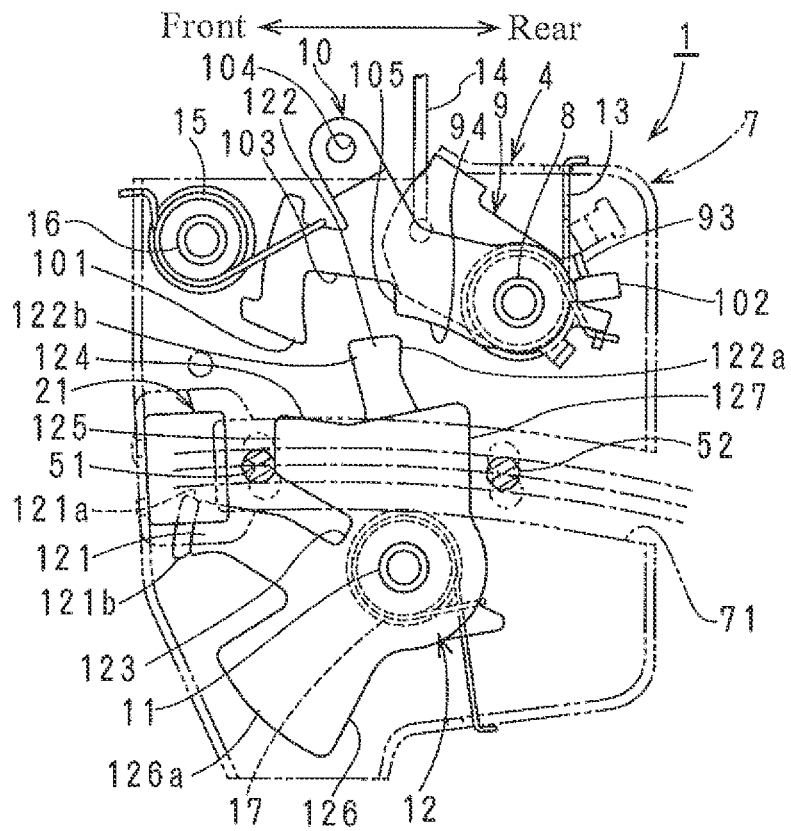
FIG. 32 is an explanatory drawing showing an unlatching operation from the second latching state of the locking mechanism of the second example.

In the following description, the placed state of a lower edge of the first ratchet 9 on a peripheral portion 126*a* of the latch 12 as shown in FIGS. 19, 20, 22 is defined as that the first ratchet 9 is in the standby position; the engagement state of the engaging portion 91 with the first arm portion 121 or the second arm portion 122 as shown in FIGS. 26, 31 is defined as that the first ratchet 9 is in the engagement position; and the come-off state of the engaging portion 91 from the first arm portion 121 or the second arm portion 122 as shown in FIGS. 27, 32 is defined as that the first ratchet 9 is in a releasing operation.

When the second ratchet 10 pivots at a predetermined angle in the releasing direction based on the operation of the operation member 6, the second ratchet 10 allows the latch 12 to pivot in the latching direction by releasing the hooking portion 101 from the first arm portion 121 or the second arm portion 122 of the latch 12. However, when the latch 12 is in the second latching position, the latch 12 is not made to pivot in the latching direction substantially because the tip portion 125 of the third arm portion 124 is abutted with the stopper 21 while the first leg portion 51 of the striker 5 is clamped between the tip portion 125 and the stopper 21.

In the following description, the placed state of the hooking portion 101 of the second ratchet 10 on the peripheral portion 126*a* of the latch 12 as shown in FIGS. 19, 20, 22 is defined as that the second ratchet 10 is in the standby position; the complete engagement state of the hooking portion 101 with the first arm portion 121 or the second arm portion 122 as shown in FIGS. 26, 31 is defined as that the second ratchet 10 is in the engagement position; and the come-off state of the hooking portion 101 from the first arm portion 121 or the second arm portion 122 as shown in FIGS. 27, 32 is defined as that the second ratchet 10 is in a releasing operation.

Based on FIGS. 22 to 33, the working of the vehicle seat locking device 1 of the second example is explained as follows.

Figure 23:
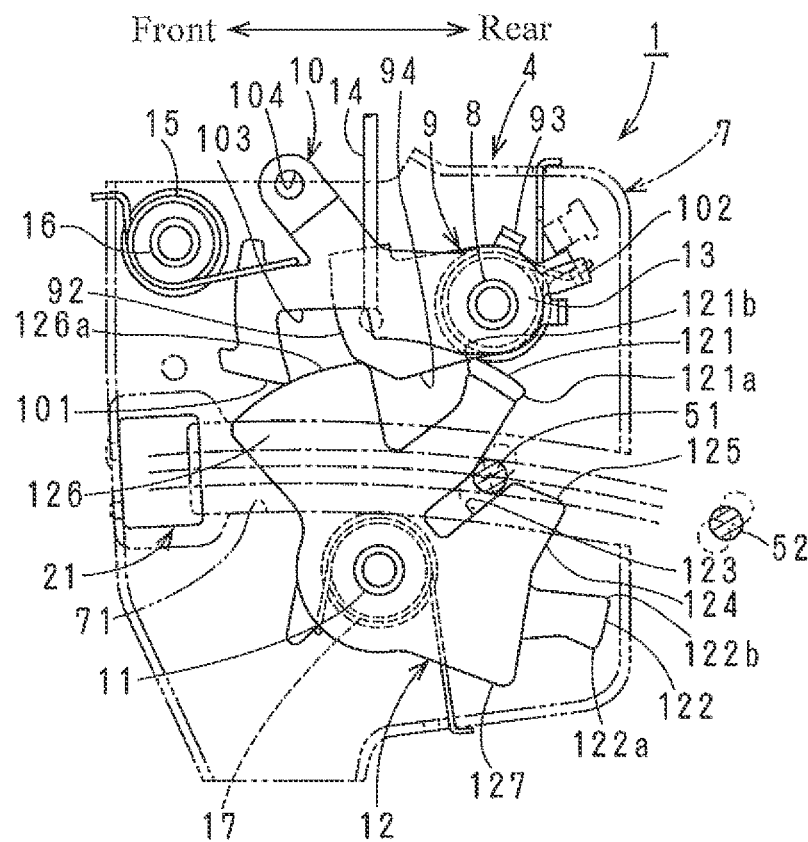
FIG. 23 is an explanatory drawing showing the first state in the middle of an operation from an unlatching state to a first latching state of the locking mechanism of the second example.
Figure 24:
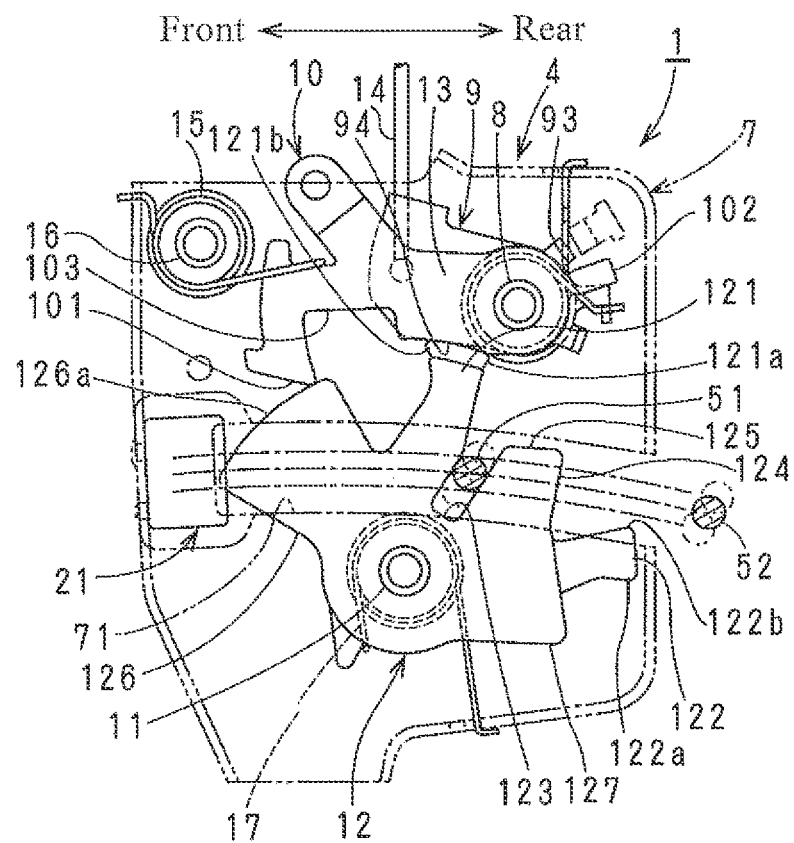
FIG. 24 is an explanatory drawing showing the second state in the middle of the operation from the unlatching state to the first latching state of the locking mechanism of the second example.
Figure 25:
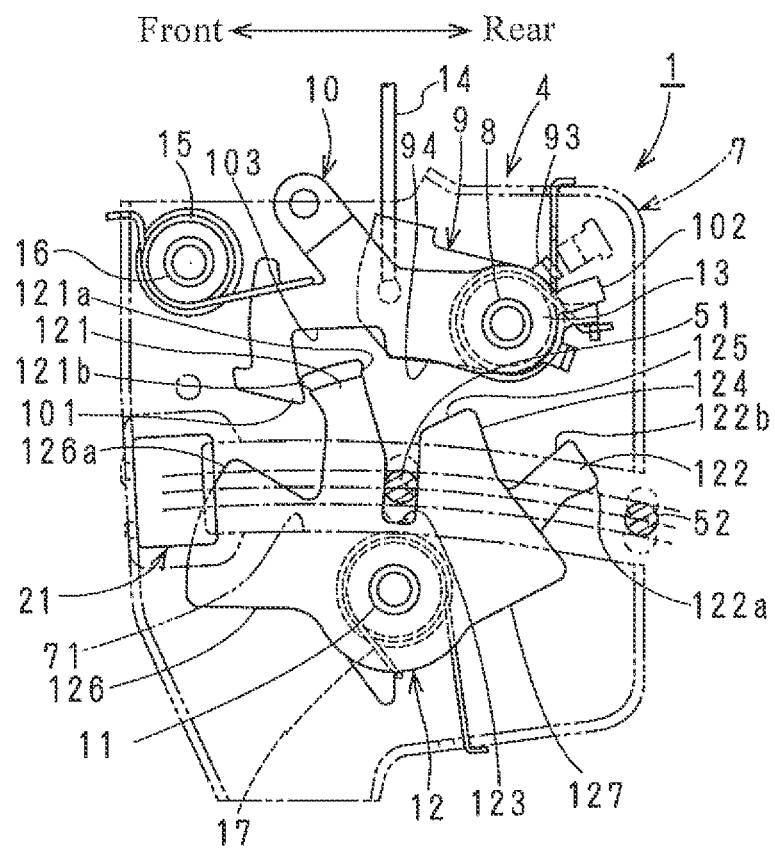
FIG. 25 is an explanatory drawing showing the third state in the middle of the operation from the unlatching state to the first latching state of the locking mechanism of the second example.
Figure 28:
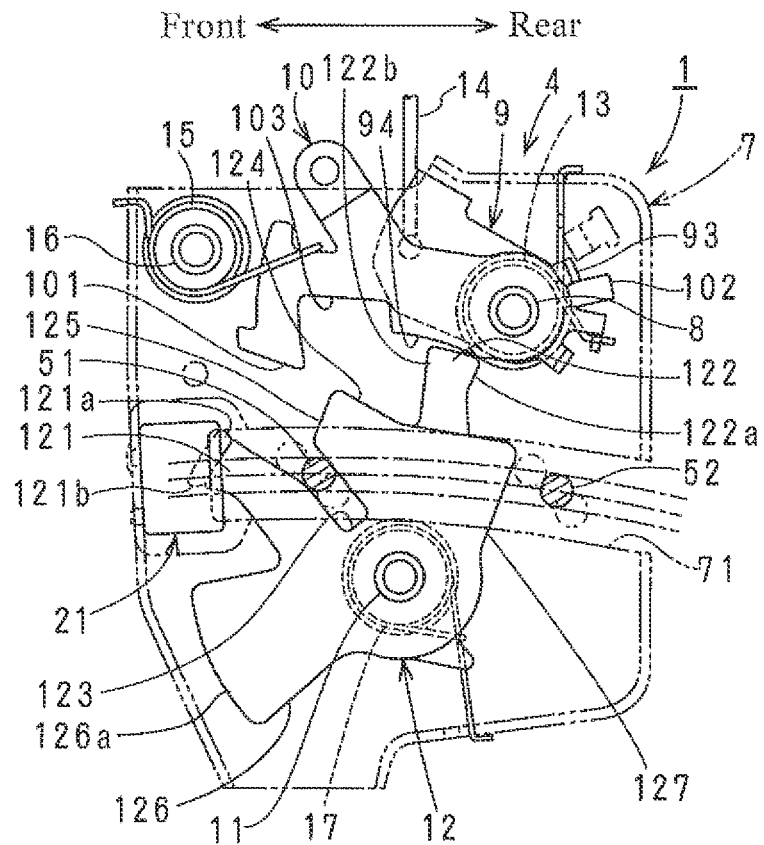
FIG. 28 is an explanatory drawing showing the fourth state in the middle of the operation from the first latching state to a second latching state of the locking mechanism of the second example.
Figure 29:
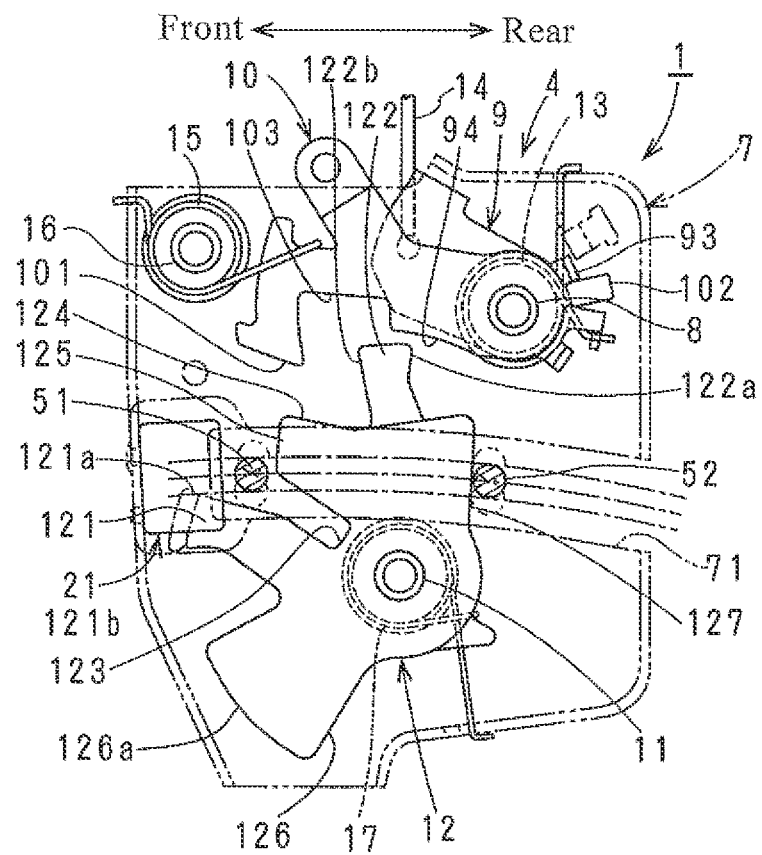
FIG. 29 is an explanatory drawing showing the fifth state in the middle of the operation from the first latching state to the second latching state of the locking mechanism of the second example.
Figure 30:
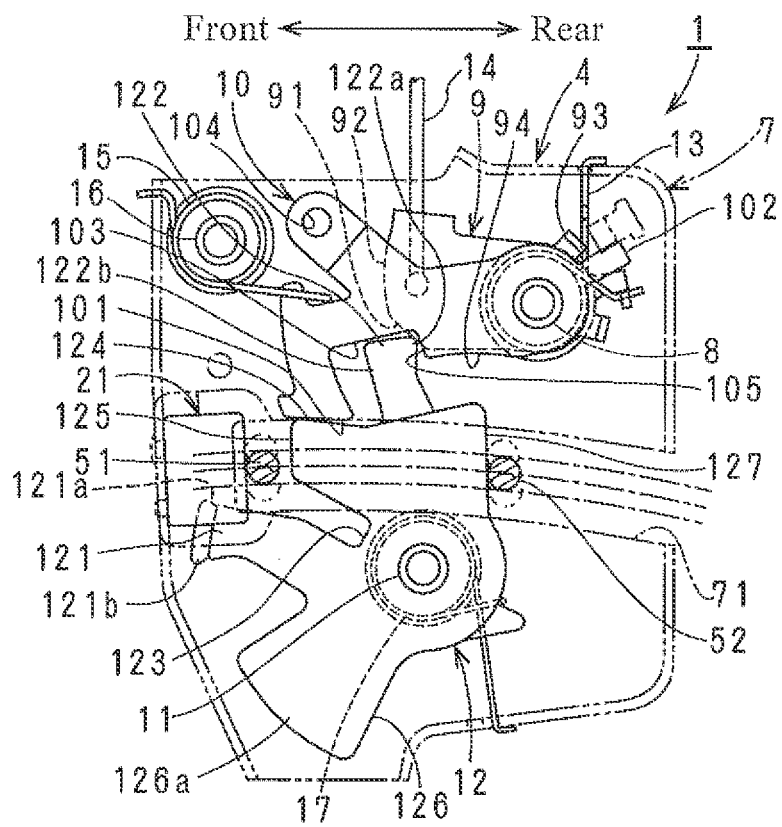
FIG. 30 is an explanatory drawing showing the sixth state in the middle of the operation from the first latching state to the second latching state of the locking mechanism of the second example.
Figure 33:
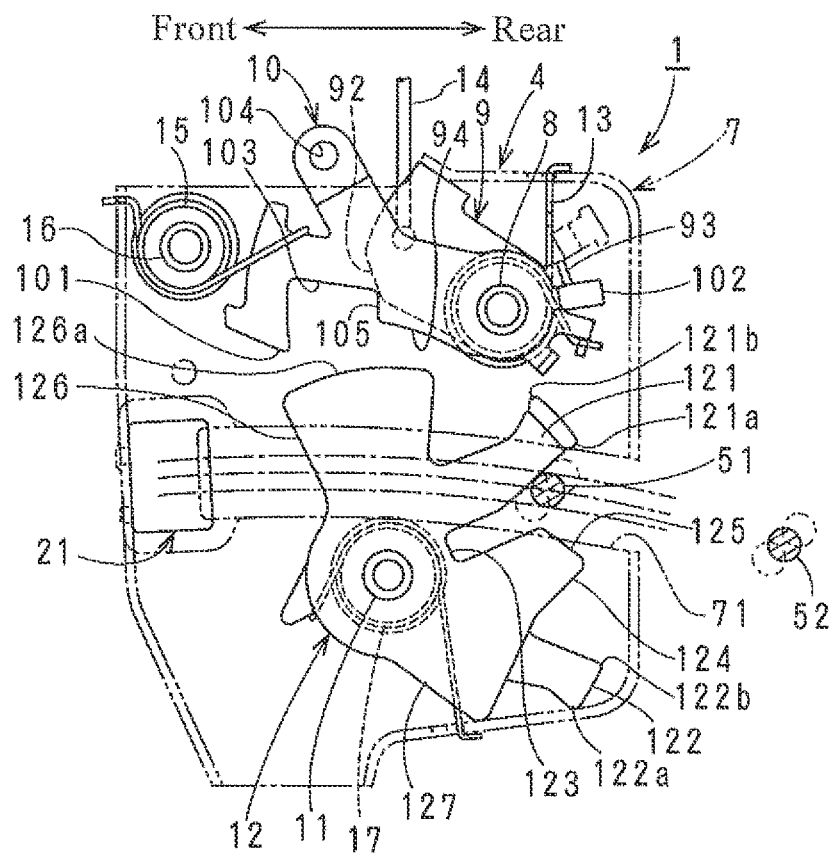
FIG. 33 is an explanatory drawing showing a state after the unlatching operation of the locking mechanism of the second example.

FIG. 22 is an explanatory drawing showing an unlatching state of the locking mechanism 4. FIG. 23 is an explanatory drawing showing a first state in the middle of an operation from the unlatching state to a first latching state of the locking mechanism 4. FIG. 24 is an explanatory drawing showing a second state in the middle of the operation from the unlatching state to the first latching state of the locking mechanism 4. FIG. 25 is an explanatory drawing showing a third state in the middle of the operation from the unlatching state to the first latching state of the locking mechanism 4. FIG. 26 is an explanatory drawing showing the first latching state of the locking mechanism 4. FIG. 27 is an explanatory drawing showing an unlatching operation from the first latching state of the locking mechanism 4. FIG. 28 is an explanatory drawing showing a fourth state in the middle of the operation from the first latching state to a second latching state of the locking mechanism 4. FIG. 29 is an explanatory drawing showing a fifth state in the middle of the operation from the first latching state to the second latching state of the locking mechanism 4. FIG. 30 is an explanatory drawing showing a sixth state in the middle of the operation from the first latching state to the second latching state of the locking mechanism 4. FIG. 31 is an explanatory drawing showing the second latching state of the locking mechanism 4. FIG. 32 is an explanatory drawing showing an unlatching operation from the second latching state of the locking mechanism 4. FIG. 33 is an explanatory drawing showing a state after the unlatching operation of the locking mechanism 4.

(In the Case of Moving the Seat Back 3B from the Falling-Down Position to the First Position)

When the seat back 3B is in the falling-down position, as shown in FIG. 22, the latch 12 is held in the unlatching position and the first and second ratchets 9, 10 are held in the respective standby positions.

When the seat back 3B is risen-up from the falling-down position, the first leg portion 51 of the striker 5 is made to enter the striker entering groove 71 to abut with the first arm portion 121 of the latch 12. Thus, as shown in FIG. 23, the latch 12 pivots from the unlatching position in the latching direction against the biasing force of the spring 17. When the latch 12 pivots in the latching direction, the first leg portion 51 of the striker 5 engages with the engaging groove 123 of the latch 12, and the tip portion of the first arm portion 121 of the latch 12 approaches a lower edge portion 94 of the first ratchet 9.

When the latch 12 further pivots in the latching direction while the first leg portion 51 of the striker 5 is engaging with the engaging groove 123, as shown in FIG. 24, the tip portion of the first arm portion 121 of the latch 12 contacts the lower edge portion 94 of the first ratchet 9. Thus, in conjunction with the pivot of the latch 12 in the latching direction, the tip portion of the first arm portion 121 pivots while slidingly contacting with the lower edge portion 94 of the first ratchet 9 to hold the first ratchet 9 in the standby position. Incidentally, in this situation, the second ratchet 10 is held in the standby position.

In the case that the first and second leg portions 51, 52 of the striker 5 are made to enter the striker entering groove 71 of the baseplate 7, even if the entering position of the striker 5 to the striker entering groove 71 of the baseplate 7 is shifted from the standard position in the vertical direction owing to the mounting position tolerance of the rear seat 2, looseness of moving parts of the seat back 3B and so forth, when each shift of movement loci of the first and second leg portions 51, 52 of the striker 5 is within a predetermined permissible range, the first and second leg portions 51, 52 of the striker 5 are allowed to enter the striker entering groove 71. Thus, even if there is a slight shift in the vertical direction between the mounting positions of the locking mechanism 4 and the striker 5, it is possible to surely engage the first leg portion 51 of the striker 5 with the engaging groove 123 of the latch 12. When the second leg portion 52 of the striker 5 slightly enters the striker entering groove 71, it does not contact the pushed portion 127 of the latch 12.

When the latch 12 further pivots in the latching direction, as shown in FIG. 25, the hooking portion 101 of the second ratchet 10 comes off from the peripheral portion 126*a* of the latch 12, and the tip portion of the first arm portion 121 of the latch 12 comes off from the lower edge portion 94 of the first ratchet 9. Thus, the first and second ratchets 9, 10 are made to be pivotable to the respective engagement positions by the respective biasing forces of the springs 13, 15, and the first arm portion 121 of the latch 12 is abutted with the hooking portion 101. Thus, the latch 12 is stopped in the first latching position to be prevented from further pivoting in the latching direction.

When the latch 12 is stopped in the first latching position, as shown in FIG. 26, the first ratchet 9 is made to pivot to the engagement position by the biasing force of the spring 13, and the second ratchet 10 is made to pivot to the engagement position by the biasing force of the spring 15. Thus, the first arm portion 121 of the latch 12 is engaged with the restraining portion 103 formed by the first and second ratchets 9, 10 to be prevented from pivoting in the latching and unlatching directions from the first latching position of the latch 12. Accordingly, the latch 12 is restrained in the first latching position, and the striker 5 is restrained in the first position shown in FIG. 26.

When the latch 12 is restrained in the first latching position and the striker 5 is restrained in the first position, as shown in FIG. 26, the engaging groove 123 is overlapped with the striker entering groove 71 in an orthogonal direction to be directed straightly upward. Thus, even if there is a slight shift in the vertical direction between the mounting positions of the locking mechanism 4 and the striker 5, it is possible to surely engage the first leg portion 51 of the striker 5 with the engaging groove 123 of the latch 12 because the first leg portion 51 of the striker 5 is capable of relatively moving in the vertical direction in the engaging groove 123 of the latch 12 such that the shift in the vertical direction is possible to be absorbed. In this state, the second leg portion 52 of the striker 5 slightly enters the striker entering groove 71, it does not contact the pushed portion 127 of the latch 12.

(In the Case of Moving the Seat Back 3B from the First Position to the Second Position)

When the seat back 3B is held in the first position, as shown in FIG. 26, the latch 12 is restrained in the first latching position, the striker 5 is restrained in the first position, and the first and second ratchets 9, 10 are held in the respective engagement positions.

When a user operates to release the operation member 6, as shown in FIG. 27, the first ratchet 9 disengages from its engagement position, and in conjunction with this disengagement, the second ratchet 10 disengages from its engagement position, too. Thus, the engaging portion 91 of the first ratchet 9 is made to come off from the first arm portion 121 of the latch 12, the hooking portion 101 of the second ratchet 10 is made to come off from the first arm portion 121 of the latch 12, and the latch 12 is made to be capable of pivoting from the first latching position in the latching and unlatching directions.

Next, the seat back 3B is pushed rearward while the operation member 6 is operated. Thus, as shown in FIG. 28, the first leg portion 51 of the striker 5 moves inward in the striker entering groove 71 to the inner portion while engaging with the engaging groove 123, the latch 12 pivots from the first latching position in the latching direction, and the pushed portion 127 enters the striker entering groove 71.

When the latch 12 pivots in the latching direction in conjunction with further entering movement of the first leg portion 51, as shown in FIG. 29, at the substantially same time that the engaging groove 123 of the latch 12 shifts in an obliquely upward posture to make the first leg portion 51 of the striker 5 exit from the engaging groove 123, the third arm portion 124 of the latch 12 overlaps with the striker entering groove 71 while being in a frontward posture, and the second leg portion 52 abuts with the pushed portion 127 of the latch 12. Accordingly, the pushed portion 127 is pressed frontward by the entering movement of the second leg portion 52 to make the latch 12 pivot in the latching direction.

When the second leg portion 52 of the striker 5 further moves in the striker entering groove 71 inward, as shown in FIG. 30, the latch 12 pivots to the position before the second latching position and the first leg portion 51 completely exits from the engaging groove 123 of the latch 12.

When the latch 12 pivots to the position before the second latching position as shown in FIG. 30, the cam portion 92 of the first ratchet 9 abuts with the second unlatching side abutting portion 122a of the second arm portion 122 of the latch 12 to make the latch 12 forcibly pivot from the position before the second latching position to the second latching position by the biasing force of the spring 13 acting on the first ratchet 9, and the latch 12 stops in the second latching position by abutting the tip portion 125 of the third arm portion 124 with the first leg portion 51 as shown in FIG. 31.

When the latch 12 stops in the second latching position, the first leg portion 51 completely exits from the engaging groove 123 of the latch 12 to be clamped between the stopper 21 and the tip portion 125 of the third arm portion 124 of the latch 12. Then, the second ratchet 10 pivots to its engagement position by the biasing force of the spring 15, and the first ratchet 9 pivots to its engagement position by the biasing force of the spring 13. Thus, the second arm portion 122 of the latch 12 engages with the restraining portion 103 formed by the first and second ratchets 9, 10 to prevent the latch 12 from pivoting in the unlatching and latching directions. Thus, the striker 5 is restrained in the second position shown in FIG. 31 to hold the seat back 3B in the second position.

In the state that the latch 12 is restrained in the second latching position and the striker 5 is restrained in the second position, the first leg portion 51 is surely restrained in the striker entering groove 71 without looseness because the first leg portion 51 of the striker 5 is clamped between the tip portion 125 of the third arm portion 124 of the latch 12 and the stopper 21 made with the elastic material.

As described above, in the second example, since the striker 5 is possible to be restrained in the first and second positions by the single latch 12, it is possible to reduce a number of parts and simplify the configuration of a vehicle seat locking device compared to the prior art.

(In the Case of Moving the Seat Back 3B from the Second Position (or the First Position) to the Falling-Down Position)

When the seat back 3B is held in the second position (or the first position), the vehicle seat locking device 1 is in the state as shown in FIG. 31 (or FIG. 26). When the operation member 6 is operated in such a state, as shown in FIG. 32 (or FIG. 27), the first and second ratchets 9, 10 are released to allow the latch 12 to pivot in the unlatching direction.

When the seat back 3B is moved frontward from the second position, as shown in FIG. 33, the first and second leg portions 51, 52 of the striker 5 is made to exit from the striker entering groove 71. Thus, the latch 12 pivots from the second latching position in the unlatching position and the engagement auxiliary lever 19 pivots to the standby position. Accordingly, it is possible to move the seat back 3B from the second position to the falling-down position. When the seat back 3B is moved frontward from the first position, although a drawing is omitted, the first leg portion 51 of the striker 5 is made to exit from the striker entering groove 71, and thus the latch 12 is made to pivot from the first latching position to the unlatching position. Accordingly, it is possible to move the seat back 3B from the first position to the falling-down position.

As described above, the foregoing relates to the second example of the present invention, but the present invention is not limited to the above second example and various changes and modifications may be added to the second example without departing from the gist of the present invention as follows.

(a) The locking mechanism 4 is fixed to the vehicle body side and the striker 5 is fixed to the seat back 3B side.
(b) The ratchet is made to be an integral form of the first ratchet 9 and the second ratchet 10.

What is claimed is:

1. A vehicle seat locking device comprising:
a striker fixed to either a vehicle body or a seat back;
a baseplate fixed to the other of the vehicle body and the seat back and provided with a striker entering groove in which a leg portion provided on the striker is capable of advancing and retreating by operation of the seat back;
a latch which is supported to the baseplate by a latch shaft to be pivotable at a predetermined angle and is pivotable from an unlatching position to a second latching position via a first latching position and vice versa, wherein the latch comprises an engaging groove capable of engaging with the leg portion entered into the striker entering groove, a first arm portion provided at a latching direction side of the engaging groove, a second arm portion provided at an unlatching direction side of the engaging groove, and a third arm portion provided between the engaging groove and the second arm portion;
a ratchet which is supported to the baseplate by a ratchet shaft to be pivotable at a predetermined angle, is biased in an engaging direction by a spring and is provided with a restraining portion engaging with the first and second arm portions to be capable of restraining the latch in the first and the second latching positions respectively; and
an engagement auxiliary lever which is supported to the baseplate by a shaft to be pivotable at a predetermined angle and is provided with first and second auxiliary arm portions, wherein the first auxiliary arm portion is capable of abutting with the leg portion entered into the striker entering groove and the second auxiliary arm portion pivots from a standby position to a restraining position by the abutment of the leg portion with the first auxiliary arm portion and is capable of abutting with the latch in the latching direction by the pivoting from the standby position to the restraining position:
wherein the latch is capable of pivoting from the unlatching position to the first latching position by the engagement of the leg portion entered into the striker entering groove with the engaging groove, and is capable of pivoting to the second latching position by the movement of the second auxiliary arm portion accompanied with the pivot of the engagement auxiliary lever to the restraining position,
wherein the engagement auxiliary lever makes the latch pivot to a position before the second latching position by abutment of the second auxiliary arm portion with a pushed portion provided on the latch, and
wherein the leg portion of the striker is made to exit from the engaging groove by the pivot of the latch to the second latching position and is clamped between the engagement auxiliary lever and a tip portion of the third arm portion.

2. The vehicle seat locking device according to claim 1, wherein the engagement auxiliary lever stops in the restraining position by abutment of the first auxiliary arm portion with the baseplate.

3. The vehicle seat locking device according to claim 2, wherein respective abutting portions on the first auxiliary arm portion of the engagement auxiliary lever with the leg portion of the striker and the baseplate are formed with a synthetic resin or an elastic material.

4. The vehicle seat locking device according to claim 1, wherein the engaging groove of the latch is positioned to overlap with the striker entering groove when the latch is positioned between the unlatching position and the position before the second latching position, and is made to retreat to a position where the engaging groove of the latch is not overlapped with the striker entering groove when the latch is positioned in the second latching position.

5. The vehicle seat locking device according to claim 1, wherein the ratchet has a cam portion, which abuts with the second arm portion of the latch by a biasing force of the spring and makes the latch pivot forcibly from the position before the second latching position to the second latching position.

6. The vehicle seat locking device according to claim 5, wherein the ratchet comprises a first ratchet supported by the ratchet shaft to be pivotable at a predetermined angle and a second ratchet supported by the ratchet shaft to be pivotable at a predetermined angle independently from the first ratchet, wherein the first ratchet has an engaging portion, which engages with the first arm portion to prevent the latch from pivoting from the first latching position in the unlatching direction and engages with the second arm portion to prevent the latch from pivoting from the second latching position in the unlatching direction, and wherein the second ratchet has a hooking portion engaging with the first arm portion to prevent the latch from pivoting from the first latching position in the latching direction.

7. The vehicle seat locking device according to claim 6, wherein the cam portion of the ratchet is continuously formed from the engaging portion of the first ratchet.

8. The vehicle seat locking device according to claim 1, wherein an opening width of the striker entering groove is more than twofold of thickness of the leg portion of the striker.

9. A vehicle seat locking device comprising:
a striker fixed to either a vehicle body or a seat back and provided with a first leg portion and a second leg portion apart from the first leg portion with a predetermined distance;
a baseplate fixed to the other of the vehicle body and the seat back and provided with a striker entering groove in which the first and second leg portions are capable of advancing and retreating by operation of the seat back;
a latch which is supported to the baseplate by a latch shaft to be pivotable at a predetermined angle and is pivotable from an unlatching position to a second latching position via a first latching position and vice versa, wherein the latch comprises an engaging groove capable of engaging with the first leg portion entered into the striker entering groove, a first arm portion provided at a latching direction side of the engaging groove, a second arm portion provided at an unlatching direction side of the engaging groove, a third arm portion provided between the engaging groove and the second arm portion, and a pushed portion with which the second leg portion entered into the striker entering groove is capable of abutting;
a ratchet which is supported to the baseplate by a ratchet shaft to be pivotable at a predetermined angle, is biased in an engaging direction by a spring and is provided with a restraining portion engaging with the first and second arm portions to be capable of restraining the latch in the first and the second latching positions respectively; and a stopper infixed to an inner portion of the striker entering groove in the baseplate:

wherein the latch is capable of pivoting from the unlatching position to the first latching position by the engagement of the first leg portion entered into the striker entering groove with the engaging groove, and is capable of pivoting to the second latching position by the abutment of the second leg portion entered into the striker entering groove with the pushed portion, and wherein the first leg portion of the striker is made to exit from the engaging groove by the pivot of the latch to the second latching position and is clamped between the stopper and a tip portion of the third arm portion.

10. The vehicle seat locking device according to claim 9, wherein the engaging groove of the latch is positioned to overlap with the striker entering groove when the latch is positioned between the unlatching position and the position before the second latching position, and is made to retreat to a position where the engaging groove of the latch is not overlapped with the striker entering groove when the latch is positioned in the second latching position.

11. The vehicle seat locking device according to claim 9, wherein the ratchet has a cam portion, which abuts with the second arm portion of the latch by a biasing force of the spring and makes the latch pivot forcibly from the position before the second latching position to the second latching position.

12. The vehicle seat locking device according to claim 11, wherein the ratchet comprises a first ratchet supported by the ratchet shaft to be pivotable at a predetermined angle and a second ratchet supported by the ratchet shaft to be pivotable at a predetermined angle independently from the first ratchet, wherein the first ratchet has an engaging portion, which engages with the first arm portion to prevent the latch from pivoting from the first latching position in the unlatching direction and engages with the second arm portion to prevent the latch from pivoting from the second latching position in the unlatching direction, and wherein the second ratchet has a hooking portion engaging with the first arm portion to prevent the latch from pivoting from the first latching position in the latching direction.

13. The vehicle seat locking device according to claim 12, wherein the cam portion of the ratchet is continuously formed from the engaging portion of the first ratchet.

14. The vehicle seat locking device according to claim 9, wherein the stopper is formed with a synthetic resin or an elastic material.

15. The vehicle seat locking device according to claim 9, wherein an opening width of the striker entering groove is more than twofold of each thickness of the first and second leg portions of the striker.

\* \* \* \* \*